(12) United States Patent
Takamura et al.

(10) Patent No.: US 8,843,113 B2
(45) Date of Patent: Sep. 23, 2014

(54) WIRELESS COMMUNICATION DEVICE, INFORMATION PROCESSING DEVICE, COMMUNICATION SYSTEM, AND METHOD FOR CONTROLLING WIRELESS COMMUNICATION DEVICE

(75) Inventors: Kazuhisa Takamura, Chiba (JP); Shinichiro Tsuda, Kanagawa (JP); Nishiki Mizusawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 188 days.

(21) Appl. No.: 13/462,381

(22) Filed: May 2, 2012

(65) Prior Publication Data

US 2012/0302211 A1    Nov. 29, 2012

(30) Foreign Application Priority Data

May 26, 2011   (JP) .................................. 2011-117581

(51) Int. Cl.
*H04M 1/66* (2006.01)
*H04W 12/06* (2009.01)

(52) U.S. Cl.
CPC .................................. *H04W 12/06* (2013.01)
USPC .................... 455/411; 723/2; 723/3; 713/168

(58) Field of Classification Search
CPC ..... H04L 63/08; H04L 63/0428; G06F 21/31; H04W 12/00–12/12
USPC .................... 455/410, 411; 726/2–7; 713/168
See application file for complete search history.

(56) References Cited

U.S. PATENT DOCUMENTS

| 2011/0010764 | A1* | 1/2011  | Lei et al. ........................... 726/7 |
| 2012/0258686 | A1* | 10/2012 | Kurokawa et al. ............ 455/410 |
| 2013/0117467 | A1* | 5/2013  | Den Hartog et al. ......... 709/244 |

FOREIGN PATENT DOCUMENTS

JP            2008-210301 A       9/2008

\* cited by examiner

*Primary Examiner* — Wayne Cai
(74) *Attorney, Agent, or Firm* — Wolf, Greenfield & Sacks, P.C.

(57) ABSTRACT

There is provided a wireless communication device including a transmission control unit configured to transmit an establishment request for establishment of connection right for wireless connection with a predetermined network, to an information processing device performing a control for establishment of the connection right, wirelessly; and a control unit configured to perform a control for the establishment of the connection right, based on establishment information transmitted from the information processing unit, on the condition that the establishment request has been authenticated by a first authentication device performing a first authentication process related to the wireless communication device, and the establishment request has been authenticated by a second authentication device performing a second authentication process related to the establishment of the connection right.

6 Claims, 16 Drawing Sheets

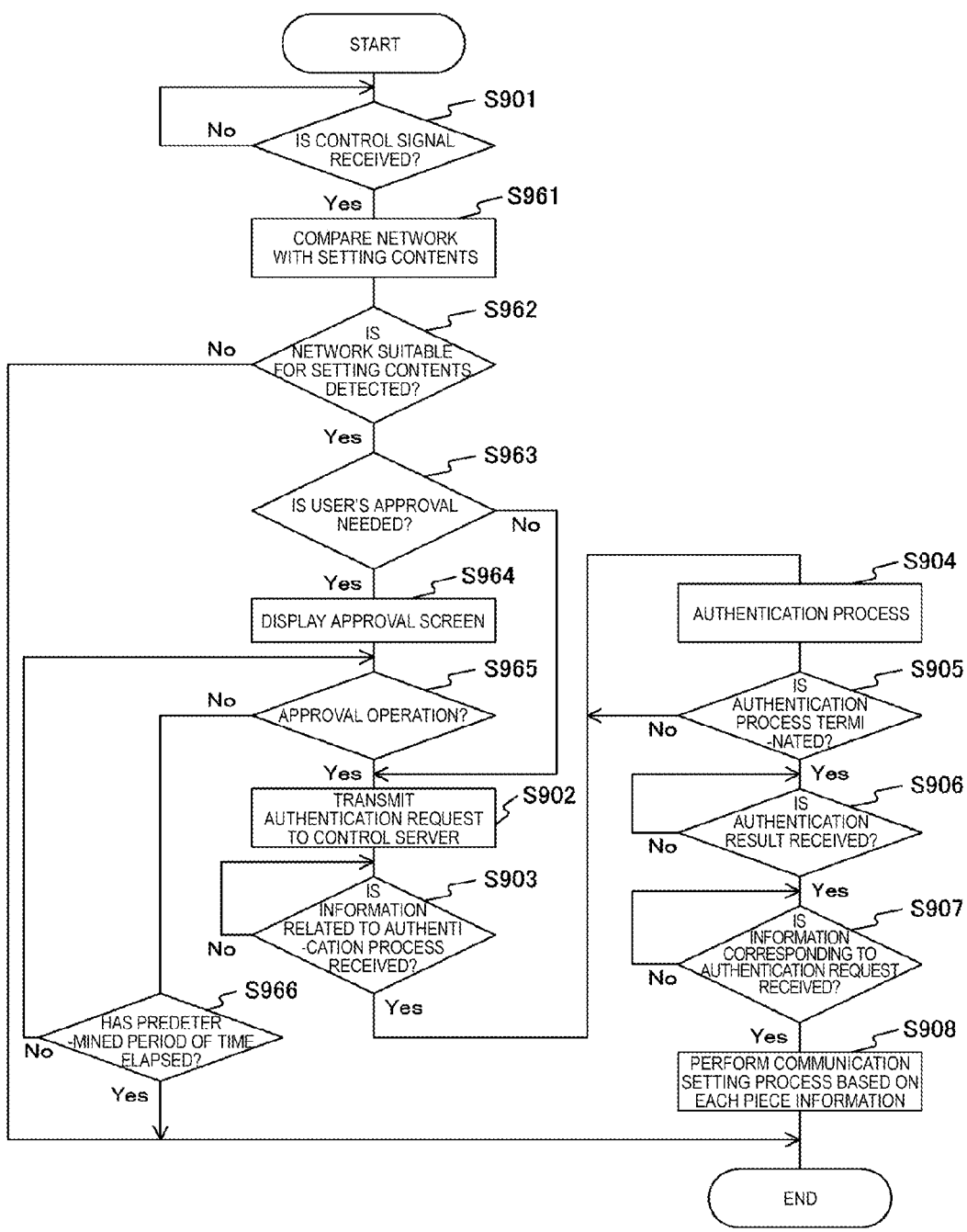

WIRELESS COMMUNICATION DEVICE, INFORMATION PROCESSING DEVICE, COMMUNICATION SYSTEM, AND METHOD FOR CONTROLLING WIRELESS COMMUNICATION DEVICE

CROSS REFERENCE TO RELATED APPLICATIONS

The present application claims priority to Japanese Patent Application No. JP 2011-117581, filed in the Japan Patent Office on May 26, 2011, the entire contents of which are incorporated herein by reference.

BACKGROUND

The present technology relates to a wireless communication device. In particular, the present technology relates to a wireless communication device performing wireless communication, an information processing device, a communication system including the wireless communication device and the information processing device, and a method of controlling the wireless communication device.

In the past, wireless communication devices such as portable phone devices connected to networks such as public wireless networks have been widely popularized. For example, a wireless communication device is mounted with a hardware module storing authentication information, and performs an authentication information exchange through a base station. The authentication information authenticating the wireless communication device is, for example, Universal Subscriber Identity Module (USIM) information.

For example, there is proposed a communication system equipped with a portable phone device mounted with a card that adds a USIM function of treating subscriber information (see, for example, Japanese Patent Application Laid-Open No. 2008-210301). This card is, for example, a Universal Integrated Circuit Card (UICC).

SUMMARY

In the related art described above, a wireless communication device may be connected to a network, such as a public wireless network, by being authenticated based on a USIM function.

In recent years, a hardware module capable of recording authentication information and a communication system using the hardware module have been proposed. For example, authentication information retained in a wireless communication device through a network is considered to be rewritable by treating authentication information by software. In this manner, it is important to facilitate the use of a wireless communication device by applying technology for rewriting authentication information through a network.

The present technology is developed in consideration of this situation, and is intended to facilitate the use of the right to connect with a network.

The present technology is developed in consideration of the above issues and according to an embodiment of the present technology, therer is provided a wireless communication device, a method of controlling the wireless communication device, and a program for causing a computer to perform the method. The wireless communication device includes a transmission control unit configured to transmit an establishment request for establishment of connection right for wireless connection with a predetermined network to an information processing device performing a control for establishment of the connection right through a wireless line; and a control unit configured to perform a control for the establishment of the connection right, based on establishment information transmitted from the information processing unit, on the condition that the establishment request has been authenticated by a first authentication device performing a first authentication process related to the wireless communication device and the establishment request has been authenticated by a second authentication device performing a second authentication process related to the establishment of the connection right. Accordingly, the establishment request is transmitted to the information processing device through a wireless line, and the connection right is established on the condition that the establishment request has been authenticated by the first authentication apparatus and also the establishment request has been authenticated by the second authentication apparatus.

According to the embodiment of the present technology, the wireless communication device may further include an authentication information storage unit configured to store first authentication information used when the first authentication process is performed. The control unit may use the first authentication information to perform the first authentication process with the first authentication device. Accordingly, the first authentication information is used to perform the first authentication process with the first authentication device.

According to the embodiment of the present technology, the first authentication information may be common authentication information that is stored and used in a plurality of wireless communication devices including the wireless communication device and other wireless communication devices, and the information processing device may retain group information on a group including the plurality of wireless communication devices, and transmits the establishment request to the first authentication device when receiving the establishment request from the wireless communication device included in the group. Accordingly, when receiving the establishment request from the wireless communication device included in the group, the information processing device transmits the establishment request to the first authentication device.

According to the embodiment of the present technology, the information processing device may transmit the establishment request to the first authentication device and also transmits the establishment request to the second authentication device when receiving the establishment request, and performs control for the establishment of the connection right for the wireless communication device on the condition that the establishment request has been authenticated by the first authentication process performed between the first authentication device and the wireless communication device, and the establishment request has been authenticated by the second authentication process performed between the second authentication device and the information processing device. Accordingly, the information processing device transmits the establishment request to the first authentication device and also transmits the establishment request to the second authentication device, when receiving the establishment request, and the connection right is established in the wireless communication device on the condition that the establishment request has been authenticated by the first authentication process performed between the first authentication device and the wireless communication device, and the establishment request has been authenticated by the second authentication process performed between the second authentication device and the information processing device.

According to the embodiment of the present technology, the connection right may be right to connect with the network by connecting with a base station related to the network based on second authentication information, and the information processing device may establish the connection right for the wireless communication device by retaining the second authentication information in the wireless communication device, on the condition that the establishment request has been authenticated by the first authentication device and the establishment request has been authenticated by the second authentication device. Accordingly, the information processing device establishes the connection right for the wireless communication device by retaining the second authentication information in the wireless communication device, on the condition that the establishment request has been authenticated by the first authentication device, and the establishment request has been authenticated by the second authentication device.

According to the embodiment of the present technology, the information processing device may transmit third authentication information for connection with a neighboring base station located in the vicinity of the base station connected to the wireless communication device based on the second authentication information, to retain the third authentication information, and the control unit may perform a connection process with the neighboring base station using the third authentication information, based on a user's operation or a state change of the wireless communication device. Accordingly, the information processing device transmits third authentication information to retain the third authentication information, and the wireless communication device performs a connection process with the neighboring base station using the third authentication information, based on a user's operation or a state change of the wireless communication device.

According to the embodiment of the present technology, the information processing device may store second authentication information used to perform the second authentication process, and the information processing device may use the second authentication information to perform the second authentication process with the second authentication device. Accordingly, the information processing device uses the second authentication information to perform the second authentication process with the second authentication device.

According to the embodiment of the present technology, the first authentication device may perform the first authentication process with the wireless communication device, and the second authentication device may perform the second authentication process with the information processing device. Accordingly, the first authentication device performs the first authentication process with the wireless communication device, and the second authentication device performs the second authentication process with the information processing device.

According to another embodiment of the present technology, therer is provided a wireless communication device, a method of controlling the wireless communication device, and a program for causing a computer to perform the method. The wireless communication device may includes a transmission processing unit configured to transmit, when receiving an establishment request for establishment of connection right for wireless connection with a predetermined network from a wireless communication device, the establishment request to a first authentication device performing a first authentication process related to the wireless communication device and the establishment request to a second authentication device performing a second authentication process related to the wireless communication device, and a control unit configured to perform a control for the establishment of the connection right for the wireless communication device, on the condition that the establishment request has been authenticated by the first authentication process performed between the first authentication device and the wireless communication device and the establishment request has been authenticated by the second authentication process performed between the second authentication device and the information processing device. Accordingly, the establishment request is transmitted to the first authentication device and also transmitted to the second authentication device, when receiving the establishment request from the wireless communication device, and control is performed to establish the connection right in the wireless communication device on the condition that the establishment request has been authenticated by the first authentication process performed between the first authentication device and the wireless communication device, and the establishment request has been authenticated by the second authentication process performed between the second authentication device and the information processing device.

According to another embodiment of the present technology, therer is provided a communication system, a method of controlling the wireless communication device, and a program for causing a computer to perform the method. The communication system may include a wireless communication device including a control unit configured to transmit an establishment request for establishment of connection right for wireless connection with a predetermined network, to an information processing device performing a control for establishment of the connection right through a wireless line, and establish the connection right based on establishment information from the information processing device, and an information processing device including a control unit configured to perform a control for the establishment of the connection right for the wireless communication device, when receiving the establishment request from the wireless communication device, on the condition that the establishment request has been authenticated by a first authentication device performing a first authentication process related to the wireless communication device and the establishment request has been authenticated by a second authentication device performing a second authentication process related to the establishment of the connection right. Accordingly, the wireless communication device transmits the establishment request to the information processing device through a wireless line, and performs control for the establishment of the connection right based on the establishment information from the information processing device. When receiving the establishment request from the wireless communication device, the information processing device performs control for the establishment of the connection right for the wireless communication device on the condition that the establishment request has been authenticated by the first authorization device and the establishment request has been authenticated by the second authorization device.

According to embodiments of the present technology, an excellent effect of facilitating the use of the right to connect with a network is achieved.

BRIEF DESCRIPTION OF THE DRAWINGS

FIG. 16 is a flow chart illustrating an example of a processing procedure of an authentication information acquisition control process by a wireless communication device 200 according to a first embodiment of the present disclosure.

DETAILED DESCRIPTION OF THE EMBODIMENT(S)

Figure 1:
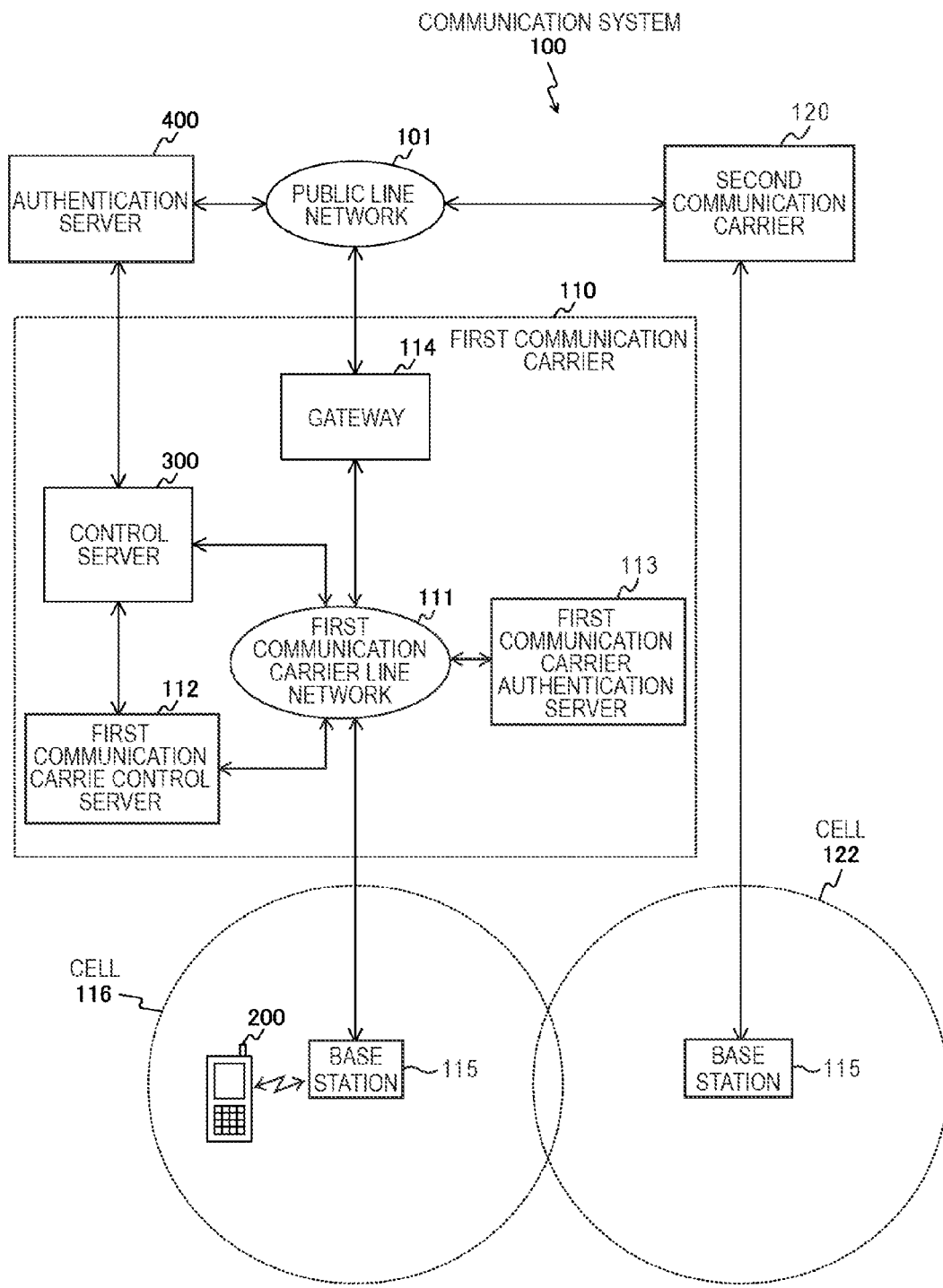
FIG. 1 is a block diagram illustrating an example of a system configuration of a communication system 100 according to a first embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments implementing the present technology (hereinafter referred to as embodiments) will be described. The description will be made in the following order.

1. First Embodiment (authentication information acquisition control: example of setting authentication information on the condition that authentication is performed through a first authentication process and a second authentication process)

2. Modified Example

<1. First Embodiment>

[Example of Configuration of Communication System]

FIG. 1 is a block diagram illustrating an example of a system configuration of a communication system 100 according to a first embodiment of the present technology.

The communication system 100 includes a public line network 101, a first communication carrier 110, a second communication carrier 120, a wireless communication device 200, an authentication server 400, and base stations 115 and 121. Herein, the first communication carrier 110 refers to the entire system including the respective devices managed by the first communication carrier 110 that provides a wireless connection service. Also, the same is true of the second communication carrier 120. Also, in FIG. 1, the illustration of the respective devices constituting the second communication carrier 120 will be omitted.

The public line network 101 is a public line network such as a telephone network or the Internet, and is connected to, for example, the first communication carrier 110, the second communication carrier 120, and the authentication server 400. Also, the public line network 101 and the first communication carrier 110 are connected through a gateway 114, and the public line network 101 and the second communication carrier 120 are connected through a gateway (not illustrated).

The first communication carrier 110 includes a first communication carrier line network 111, a first communication carrier control server 112, a first communication carrier authentication server 113, the gateway 114, the base station 115, and a control server 300.

The first communication carrier line network 111 is a communication line network (for example, a dedicated line network) to which the respective devices managed by the first communication carrier 110 are connected.

The first communication carrier control server 112 is a server that may be connected to the public line network 101, the first communication carrier line network 111, and other line networks. The first communication carrier control server 112 performs various controls for the access from the wireless communication device 200. The first communication carrier control server 112 corresponds to, for example, a Proxy-Call Session Control Function (P-CSCF). Also, the P-CSCF is defined by Third Generation Partnership Project (3GPP).

The first communication carrier authentication server 113 is a server (second authentication device) that performs an authentication process (second authentication process) with respect to an authentication request transmitted from the wireless communication device 200. For example, the first communication carrier authentication server 113 authenticates only a wireless communication device retaining valid authentication information (second authentication information), among wireless communication devices connected through the base station 115, except for a specific case. Also, the specific case is, for example, a case in which an emergency call is made (for example, calling the police, fire station, and so on). Also, the first communication carrier authentication server 113 corresponds to, for example, a Serving-Call Session Control Function (S-CSCF) and a Home Subscriber Server (HSS) defined by 3GPP.

The gateway 114 is a gateway that connects the first communication carrier 110 and the public line network 101.

The base station 115 is a base station that is operated by the first communication carrier 110, and is a mobile communication base station (NodeB) that connects the wireless communication device 200 and the first communication carrier 110 through a wireless line. Also, the base station 121 is a base station that is operated by the second communication carrier 120, and is a mobile communication base station (NodeB) that connects the wireless communication device 200 and the second communication carrier 120 through a wireless line. Also, in FIG. 1, a range reached by radio waves of the base station 115 (wireless communication range) is schematically illustrated as a cell 116, and a range reached by radio waves of the base station 122 is schematically illustrated as a cell 122.

Also, in an embodiment of the present technology, a base station refers to both the base station itself and a cell specified by the base station. For example, in an embodiment of the present technology, a contract to use a base station also refers to a contract to use a cell specified by the base station.

The wireless communication device 200 is, for example, a portable phone device (for example, a smart phone), an e-book display device having a wireless communication function, or an information processing device having a wireless communication function (for example, a note-type personal computer). Also, the wireless communication device 200 will be described in detail with reference to FIG. 2.

The control server 300 is a server that is connectable to the public line network 101, the first communication carrier line network 111, other line networks, and so on. The control server 300 performs various controls for the access from the wireless communication device 200. The control server 300 corresponds to, for example, a P-CSCF defined by 3GPP. Also, the control server 300 will be described in detail with reference to FIG. 3. Also, the control server 300 is an example of an information processing device described in the claims.

The authentication server 400 is a server (first authentication device) that performs an authentication process (first authentication process) with respect to an authentication request transmitted from the wireless communication device 200. Herein, although FIG. 1 illustrates an example of installing the authentication server 400 outside the first communication carrier 110, the authentication server 400 may be installed in the first communication carrier 110. Also, the control server 300 and the authentication server 400 may be operated by a communication carrier providing a wireless connection service (for example, the first communication carrier 110), or may be operated by other carriers. Herein, the other carriers may be, for example, a Mobile Virtual Network Operator (MVNO) (or business-form carrier called a virtual communication carrier). Also, the authentication server 400 corresponds to, for example, an S-CSCF and an HSS defined by the 3GPP. Also, the authentication server 400 will be described in detail with reference to FIG. 4.

Herein, a user owning the wireless communication device 200 makes a contract for a wireless connection service with a carrier that operates the control server 300 and the authentication server 400. This contract is the contract to connect with the control server 300 and the authentication server 400 on the basis of first authentication information.

Herein, the first authentication information is information that is used when the authentication server 400 performs an authentication process (first authentication process). The first authentication information is used to identify the wireless communication device 200 as a legitimate terminal when the wireless communication device 200 accesses the authentication server 400.

Figure 2:
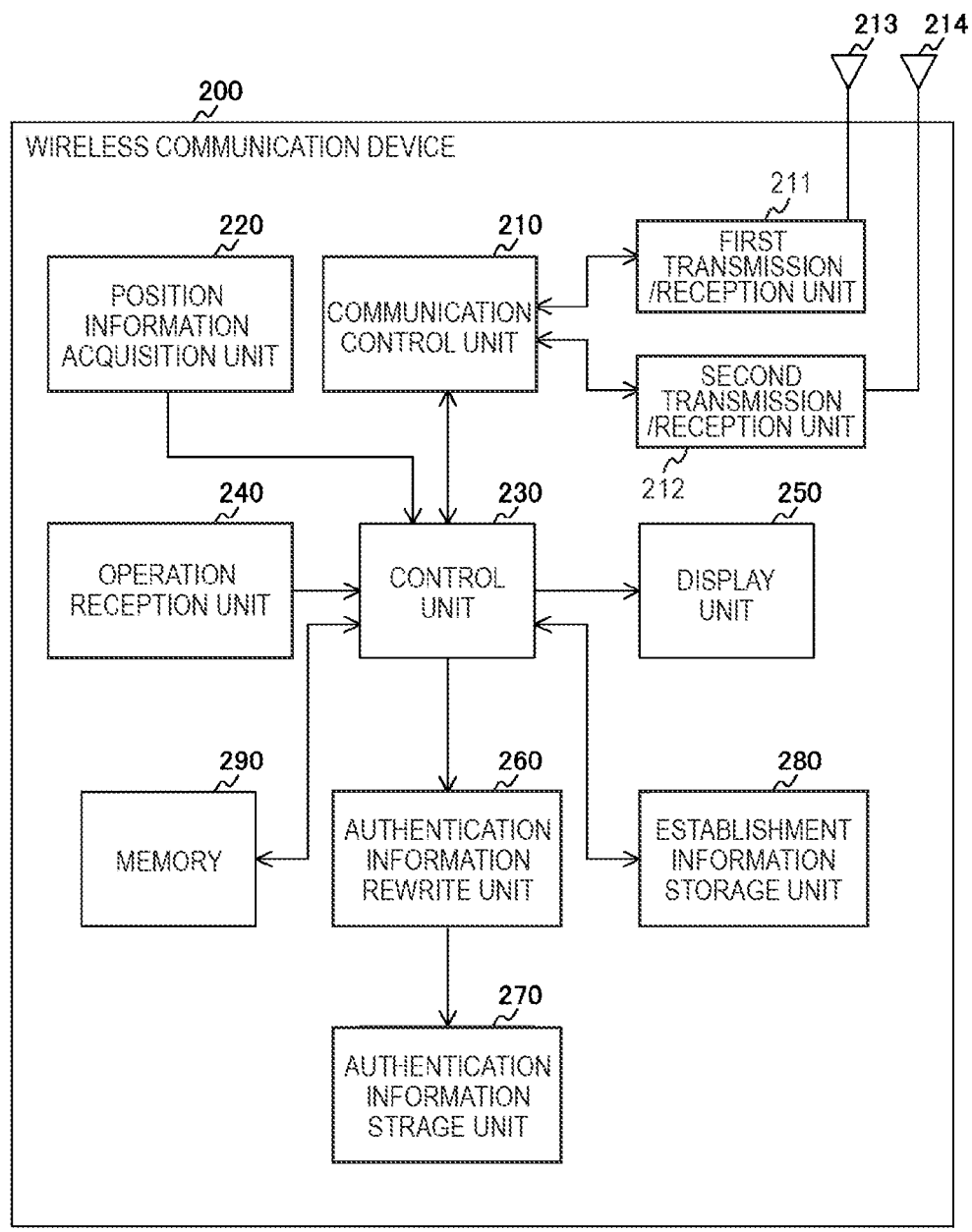
FIG. 2 is a block diagram illustrating an example of a functional configuration of a wireless communication device 200 according to a first embodiment of the present technology.

For example, the wireless communication device 200 retains an access point name (APN), a user name, and a password as the first authentication information in each communication carrier (for example, stored in an authentication information storage unit 270 illustrated in FIG. 2). Then, on the basis of the position of the wireless communication device 200 and a control signal from a base station, the wireless communication device 200 determines a communication carrier operating the base station. Using the first authentication information related to the communication carrier, the wireless communication device 200 attempts to access the base station. Also, the first authentication information is used in common by a plurality of wireless communication devices.

Also, in addition to each piece of information (APN, user name, and password), information related to a user ID may be used to access a communication carrier. Although, this information is stored in, for example, a Universal Subscriber Identity Module (USIM), it may be shared by a plurality of users. That is, in the first authentication process, the same user ID is used for access, and terminal identification information (terminal ID) is transmitted separately. In this manner, in the network of a communication carrier, a process related to the same user ID may be executed to perform a specific process for only a user that uses this service.

Thus, in the first embodiment of the present technology, the first authentication information is authentication information that is used to connect with the authentication server 400 through the control server 300. Also, the second authentication information is authentication information that is used to connect with a predetermined network (for example, the public line network 101) through a communication carrier. That is, the second authentication information is authentication information that is used to connect with a predetermined network (for example, the public line network 101) by connecting with a base station operated by a communication carrier.

Also, the first embodiment of the present technology illustrates an example in which the wireless communication device 200 containing the first authentication information acquires the authentication information of the first communication carrier 110 (second authentication information). Thus, if the wireless communication device 200 has acquired the second authentication information of the first communication carrier 110, the wireless communication device 200 may connect with the network (the public line network 1010) using the base station 115 operated by the first communication carrier 110.

Also, although FIG. 1 illustrates only the first communication carrier 110 and the second communication carrier 120 as communication carriers for ease of description, the present technology may also be similarly applicable to the case in which there are three or more communication carriers. Also, although FIG. 1 illustrates only the base stations 115 and 121 as base stations operated by each communication carrier, for ease of description, the present technology may also be similarly applicable to the case in which there are two or more base stations operated by each communication carrier.

[Example of Configuration of Wireless Communication Device]

FIG. 2 is a block diagram illustrating an example of a functional configuration of the wireless communication device 200 according to the first embodiment of the present technology.

The wireless communication device 200 includes a communication control unit 210, a first transmission/reception unit 211, a second transmission/reception unit 212, and a position information acquisition unit 220. Also, the wireless communication device 200 includes a control unit 230, an operation reception unit 240, a display unit 250, an authentication information rewrite unit 260, an authentication information storage unit 270, an establishment information storage unit 280, and a memory 290. The wireless communication device 200 may be, for example, a portable phone device capable of telephony and data communication. Also, the illustration and description of a microphone, a speaker, and so on will be omitted.

The first transmission/reception unit 211 and the second transmission/reception unit 212 transmit/receive various kinds of information based on the control of the communication control unit 210. That is, the first transmission/reception unit 211 includes a reception unit configured to receive a wireless signal from each base station through an antenna 213 and a transmission unit configured to transmit a wireless signal to each base station through the antenna 213, and is a communication unit corresponding to a predetermined wireless communication service. Also, the second transmission/reception unit 212 includes a reception unit configured to receive a wireless signal from each base station through an antenna 214 and a transmission unit configured to transmit a wireless signal to each base station through the antenna 214, and is a communication unit corresponding to a predetermined wireless communication service.

Herein, the wireless communication services corresponding to the first transmission/reception unit 211 and the second transmission/reception unit 212 are different from each other. For example, the first transmission/reception unit 211 and the second transmission/reception unit 212 may use one or more communication schemes that enable communication between the respective base stations. For example, the communication schemes are Long Term Evolution (LTE), LTE-advanced (LTE-A), and IEEE802.11a/b/n/g. Also, for example, the communication schemes are Wideband Code Division Multiple Access (W-CDMA) and High Speed Packet Access Plus (HSPA+). Also, for example, the communication schemes are General Packet Radio Service (GPRS) and Worldwide Interoperability for Microwave Access (WiMAX). The first transmission/reception unit 211 and the second transmission/reception unit 212 may perform communication according to these communication schemes. In this manner, the wireless communication device 200 corresponding to a plurality of communication schemes may switch among the networks of a plurality of communication carriers.

The communication control unit 210 performs various communication controls based on the control of the control unit 230. For example, the communication control unit 210 performs various controls related to communication with the respective devices connected through the base stations 115 and 121 (for example, the control server 300). In addition, the communication control unit 210 is an example of a transmission control unit described in the claims.

The position information acquisition unit 220 acquires position information indicating the position of the wireless communication device 200, and outputs the obtained position information to the control unit 230. The position information acquisition unit 220 may be implemented by, for example, a Global Positioning System (GPS) unit that calculates position information based on a GPS signal received through a GPS signal reception antenna. The calculated position information includes position-related data such as latitude, longitude, and altitude at the time of reception of the GPS signal. Also, the position information acquisition unit 220 may use position information acquisition devices that acquire position information by other position information acquisition methods. For example, the position information acquisition unit 220 may use a position information acquisition device that derives position information using access point information by an adjacent wireless Local Area Network (LAN) and acquires the position information. Also, the position information acquisition unit 220 may acquire time information as well as position information, and include the time information in the position information. In this case, the time information may be used for time synchronization. For example, the time information may be used to acquire data of a time synchronization satellite such as GPS.

The control unit 230 performs various controls based on a control program stored in the memory 290. The control unit 230 includes, for example, a microprocessor. For example, the control unit 230 is connected to the communication control unit 210, and performs various data transmission/reception controls with the control server 300 connected through the base station 115.

The operation reception unit 240 receives a user's operation input, and outputs a signal corresponding to the received operation input to the control unit 230. The operation reception unit 240 includes, for example, various keys such as numeric keys and alphabetic keys.

The display unit 250 is a display unit that displays various information (character information, time information, and so on) based on the control of the control unit 230. The display unit 250 displays, for example, information related to network connection right establishment (for example, display screens illustrated in FIGS. 12 and 14). Also, the display unit 250 may use, for example, display panels such as an organic Electro Luminescence (EL) panel and a Liquid Crystal Display (LCD) panel. Also, the operation reception unit 240 and the display unit 250 may be integrated using a touch panel that enables a user to perform an operation input by touching or approaching his finger to a display screen.

The authentication information rewrite unit 260 rewrites the second authentication information (for example, USIM information) stored in the authentication information storage unit 270, based on the control of the control unit 230. Herein, the state of retaining the second authentication information related to the first communication carrier 110 may be understood as the state in which network connection right is established to connect with the base station 115 related to the first communication carrier 110 and connect with a network (for example, the public line network 101).

Herein, the network connection right is the right to connect with a base station through a wireless line network and connect with a predetermined network (for example, the public line network 101), and corresponds to, for example, the right corresponding to the right to use the authentication information (second authentication information). The authentication information is, for example, Universal Subscriber Identity Module (USIM) information. The USIM information is information including telephone subscriber information and authentication key information. Also, for example, the presence/absence of the network connection right may be determined according to the presence/absence of the right to use the second authentication information (for example, the USIM information).

The authentication information storage unit 270 is a storage unit that stores authentication information (for example, USIM information). The authentication information storage unit 270 stores, for example, the first authentication information and the second authentication information. For example, a Universal Integrated Circuit (UICC) or a dedicated memory for securely keeping USIM information may be used as the authentication information storage unit 270. Also, when a UICC card is used as the authentication information storage unit 270, the USIM information may be activated and deactivated without being written in a fixed manner. That is, the authentication information rewrite unit 260 may be used to activate and deactivate the stored USIM information. Also, the authentication information rewrite unit 260 may be used to rewrite the stored USIM information. Also, the USIM information activation/deactivation processes may be performed through the activation/deactivation processes defined by Third Generation Partnership Project (3GPP). These processes are performed by, for example, a sale shop of a portable phone device. Also, if USIM information is stored in the authentication information storage unit 270, the USIM information may be stored in an encrypted form so that the USIM information cannot be read by other communication carriers.

The establishment information storage unit 280 is a storage unit that stores establishment information transmitted from the control server 300. Based on this establishment information, network connection right is established in the wireless communication device 200. Also, the establishment information is information that is used to perform the establishment for encrypted communication with the first communication carrier server 112. That is, the establishment information is information used to establish the network connection right, and includes, for example, encryption key information used in a communication path encryption protocol, Internet Protocol (IP) addresses of various servers, and information about the communication path. Also, the various servers include a Domain Name System (DNS) server, a Dynamic Host Configuration Protocol (DHCP) server, and so on. The various servers include a Call Session Control Function (CSCF) server and so on. Also, the information about the communication path includes, for example, position information (for example, latitude and longitude) of a connected base station, communication-related information (frequency band, communication scheme, and access base station information). Also, if the network connection right to be established is the right to connect with the base station based on the USIM information, a setting method for setting valid USIM information (for example, setting by an activation/deactivation process, and setting by a USIM information rewrite process) may be included in the establishment information.

The memory 290 is a memory storing a variety of information, and stores a variety of information.

For example, based on the control of the control unit 230, the communication control unit 210 performs a transmission control to transmit an authentication request (establishment request) for network connection right establishment to the control server 300 through the base station 115. Also, based on the establishment information received from the control server 300, the control unit 230 performs a control to establish the network connection right related to the authentication request.

Herein, when receiving the authentication request, the control server 300 transmits the authentication request to the authentication server 400 and also transmits the authentication request to the first communication carrier authentication server 113.

Also, the authentication server 400 performs an authentication process with the wireless communication device 200 (first authentication process), and the first communication carrier authentication server 113 performs an authentication process with the control server 300 (second authentication process). In this case, the control unit 230 performs the first authentication process with the authentication server 400 using the authentication information (second authentication information) stored in the authentication information storage unit 270. Also, a control unit 330 (illustrated in FIG. 3) of the control server 300 performs the second authentication process with the first communication carrier authentication server 113 using the authentication information (second authentication information) stored in an authentication information storage unit 370 (illustrated in FIG. 3).

Also, on the condition that authentication for the authentication request is performed by the first authentication process and also authentication for the authentication request is performed by the second authentication process, the control server 300 performs a control to establish network connection right for the wireless communication device 200. That is, on the condition that the authentication has been performed, the control server 300 transmits establishment information (including the second authentication information) to the wireless communication device 200 to retain the establishment information, thereby establishing the network connection right for the wireless communication device 200. In this case, on the condition that the authentication has been performed, on the basis of the establishment information received from the control server 300, the control unit 230 performs a control to establish the network connection right. As described above, the first authentication information is common authentication information that is stored and used in a plurality of wireless communication devices including the first wireless communication device and other wireless communication devices.

[Example of Configuration of Control Server]

Figure 3:
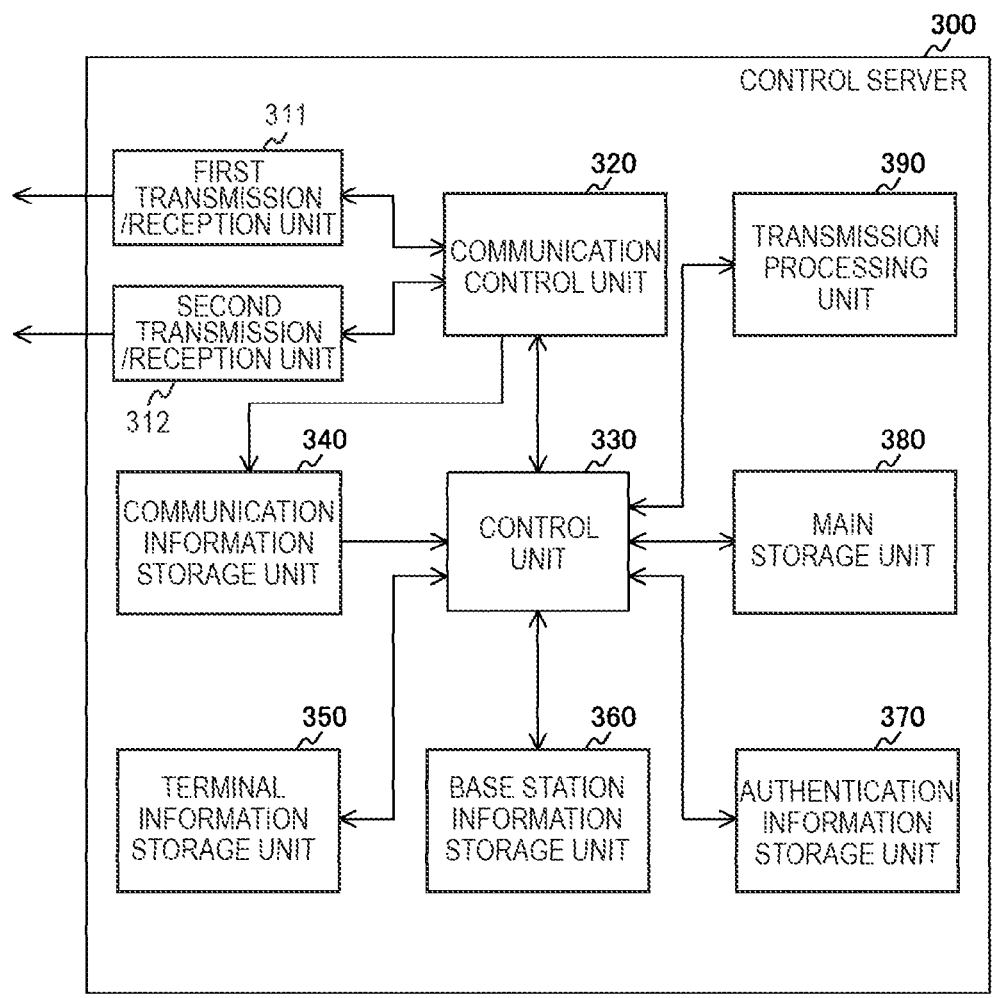
FIG. 3 is a block diagram illustrating an example of a functional configuration of a control server 300 according to a first embodiment of the present technology.

FIG. 3 is a block diagram illustrating an example of a functional configuration of the control server 300 according to the first embodiment of the present technology. Also, the control server 300 has substantially the same configuration with respect to the first communication carrier control server 112 operated by the first communication carrier 110, and a second communication carrier control server (not illustrated) operated by the second communication carrier 120. Thus, a description of control servers other than the control server 300 will be omitted.

The control server 300 includes a first transmission/reception unit 311, a second transmission/reception unit 312, a communication control unit 320, a control unit 330, and a communication information storage unit 340. Also, the control server 300 includes a terminal information storage unit 350, a base station information storage unit 360, an authentication information storage unit 370, a main storage unit 380, and a transmission processing unit 390.

The first transmission/reception unit 311 and the second transmission/reception unit 312 transmit/receive various kinds of information based on the control of the communication control unit 320. That is, each of the first transmission/reception unit 311 and the second transmission/reception unit 312 is a communication unit that includes a reception unit configured to receive information from each device and a transmission unit configured to transmit information to each device.

Herein, it is also assumed that an authentication server is present outside a core network of a specific communication carrier and the communication scheme of a connection destination is different. Accordingly, the communication scheme corresponding to the first transmission/reception unit 311 is different from the communication scheme of the second transmission/reception unit 312. For example, the communication scheme corresponding to the first transmission/reception unit 311 corresponds to the first communication carrier 110, and the communication scheme corresponding to the second transmission/reception unit 312 corresponds to the authentication server 400.

The communication control unit 320 performs various communication controls based on the control of the control unit 330. For example, the communication control unit 320 performs communication controls with the wireless communication device 200, the authentication server 400, and the first communication carrier control server 112 through the first transmission/reception unit 311 or the second transmission/reception unit 312.

The control unit 330 performs various controls based on a control program stored in the main storage unit 380. The control unit 330 includes, for example, a microprocessor. For example, the control unit 330 is connected to the communication control unit 320, and performs various data transmission/reception controls with each device.

For example, on the condition that authentication has been performed through the first authentication process and authentication has been performed through the second authentication process, the control unit 330 performs a control to establish the network connection right for the wireless communication device that has transmitted an authentication request. Herein, the first authentication process is, for example, the authentication process performed between the authentication server 400 and the wireless communication device 200. Also, the second authentication process is, for example, the authentication process performed between the first communication carrier authentication server 113 and the control server 300.

The communication information storage unit 340 acquires communication establishment information about the wireless communication device 200 on the basis of the information output from the communication control unit 320, and outputs the acquired communication establishment information to the control unit 330. For example, the communication information storage unit 340 may receive information about a communication path of the base station to which the wireless communication device 200 is connected, from the base station. Also, the communication information storage unit 340 may acquire communication establishment information periodically or aperiodically.

The terminal information storage unit 350 is a storage unit storing information for management of a wireless communication device to be connected (terminal information), and provides the stored terminal information to the control unit 330.

The base station information storage unit 360 is a storage unit storing information about a base station (base station information), and provides the stored base station information to the control unit 330. The base station information is, for example, information about a base station accessible by the control server 300 and information about neighboring base stations. As the base station information, for example, identification information for identification of each base station (base station ID), information about the installation position of each base station (position information), and information about a communication scheme of each base station (communication scheme information) are stored in association with each base station. Herein, the communication scheme of each base station corresponds to the communication scheme of a wireless communication device.

The authentication information storage unit 370 is a storage unit storing the authentication information (second authentication information) used in the authentication process (second authentication process) by each authentication device (for example, the first communication carrier authentication server 113), and provides the stored authentication information to the control unit 330. The control unit 330 performs the authentication process (second authentication process) with each authentication device using the authentication information stored in the authentication information storage unit 370.

The main storage unit 380 is a main storage unit storing a variety of information, and stores various information. The main storage unit 380 stores group information about a group including a plurality of wireless communication devices. The group is a group that shares the first authentication information (for example, an authentication key used for the authentication process) used in the authentication process (first authentication process) by the authentication server 400. Also, when receiving an authentication request from the wireless communication device included in the group, the control unit 330 performs a control to transmit the establishment information to the authentication server 400.

Herein, the control server 300 may set a different encryption key according to, for example, a service providing plan or a serving providing region. Accordingly, an authentication method may be flexibly changed according to each service, and the range of the influence of the leakage of an encryption key may be restricted.

The transmission processing unit 390, when receiving an authentication request (a establishment request) from a wireless communication device, performs a transmission process to transmit the authentication request to each authentication server. For example, when receiving an authentication process from the wireless communication device 200, the transmission processing unit 390 performs a transmission process to transmit the authentication request to the authentication server 400, and performs a transmission process to transmit the authentication request to the authentication server 113.

[Example of Configuration of Authentication Server]

Figure 4:
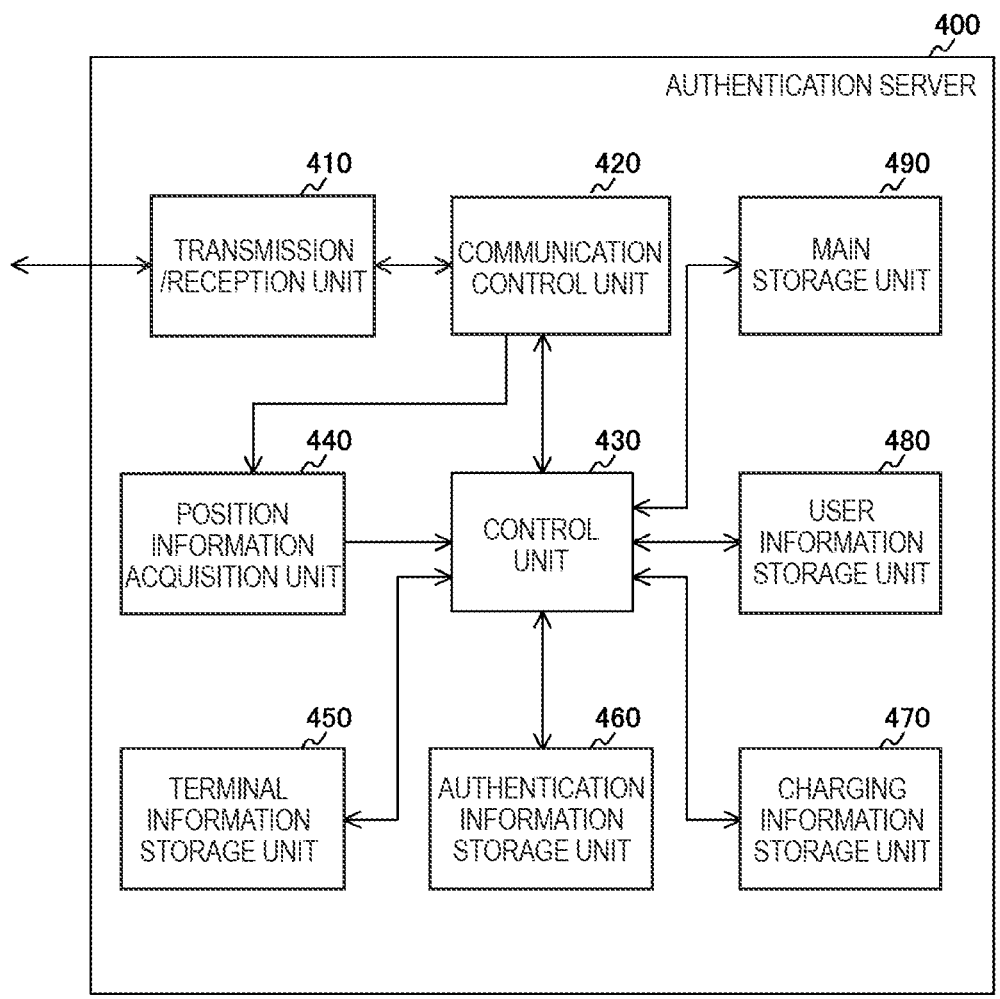
FIG. 4 is a block diagram illustrating an example of a functional diagram of an authentication server 400 according to a first embodiment of the present technology.

FIG. 4 is a block diagram illustrating an example of a functional configuration of the authentication server 400 according to the first embodiment of the present technology. Also, the control server 400 has substantially the same configuration with respect to the first communication carrier authentication server 113 operated by the first communication carrier 110, and a second communication carrier authentication server (not illustrated) operated by the second communication carrier 120. Thus, a description of control servers other than the control server 400 will be omitted.

The authentication server 400 includes a transmission/reception unit 410, a communication control unit 420, a control unit 430, a position information acquisition unit 440, a terminal information storage unit 450, an authentication information storage unit 460, a charging information storage unit 470, a user information storage unit 480, and a main storage unit 490.

The transmission/reception unit 410 transmits/receives various kinds of information based on the control of the communication control unit 420. That is, the transmission/reception unit 410 is a communication unit that includes a reception unit configured to receive information from each device and a transmission unit configured to transmit information to each device.

The communication control unit 420 performs various communication controls based on the control of the control unit 430. For example, the communication control unit 420 performs communication controls with the wireless communication device 200, the wireless communication device 200, and the control server 300 through the transmission/reception unit 410.

The control unit 430 performs various controls based on a control program stored in the main storage unit 490. The control unit 430 includes, for example, a microprocessor. For example, the control unit 430 is connected to the communication control unit 420, and performs various data transmission/reception controls with each device. Also, for example, the control unit 430 performs an authentication process (first authentication process) with respect to an authentication request received from a wireless communication device through the control server 300.

The position information acquisition unit 440 acquires position information indicating the position of the wireless communication device 200, based on the information output from the communication control unit 420, and outputs the obtained position information to the control unit 430. For example, the position information acquisition unit 440 may acquire the position information acquired by a position information acquisition unit of the wireless communication device 200, periodically or aperiodically.

The terminal information storage unit 450 is a storage unit storing information about an information processing device to be connected (terminal information (for example, terminal identification information, and communication scheme information)), and provides the stored terminal information to the control unit 430.

The authentication information storage unit 460 is a storage unit storing each piece of information (authentication information) used in the authentication process (the first authentication process) with respect to an authentication request from a wireless communication device, and provides the stored authentication information to the control unit 430.

The charging information storage unit 470 is a storage unit that stores information about the charging (charging information) for communication performed by the wireless communication device having network connection right set based on an authentication request. Also, the charging information storage unit 470 provides the stored charging information (for example, a communication cost rate and charging history information) to the control unit 430.

The user information storage unit 480 is a storage unit storing information about a user (user information (for example, name and identification number)) owning an information processing device to be connected, and provides the stored user information to the control unit 430.

The main storage unit 490 is a main storage unit storing a variety of information, and stores a variety of information.

[Example of Authentication Process of Communication System]

Figure 5:
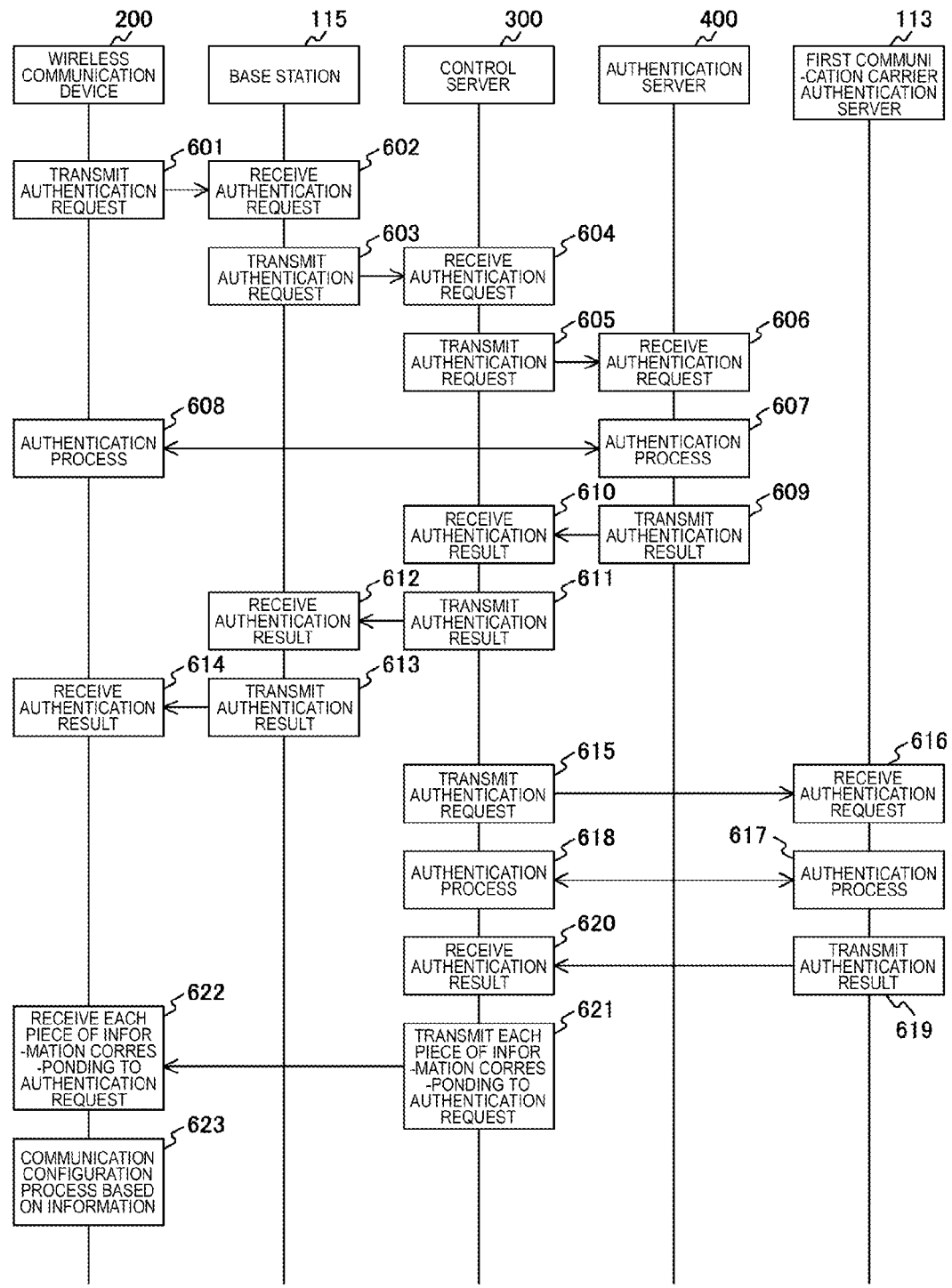
FIG. 5 is a sequence chart illustrating an example of a communication process among the respective devices constituting the communication system 100 according to a first embodiment of the present technology.

FIG. 5 is a sequence chart illustrating an example of a communication process among the respective devices constituting the communication system 100 according to the first embodiment of the present technology. FIG. 5 illustrates an example in which the wireless communication device 200 automatically acquires the second authentication information (for example, USIM information) for connection with the first communication carrier 110. Also, in FIG. 5, the illustration of the configurations other than the wireless communication device 200, the base station 115, the control server 300, the authentication server 400, and the first communication carrier authentication server 113 is omitted.

First, the wireless communication device 200 is in a standby state in which it waits to receive a control signal from the base station 115. When receiving a control signal from the base station 115, the control unit 230 transmits an authentication request to the control server 300 through the base station 115 using the first authentication information stored in the authentication information storage unit 270 (601 to 604).

Herein, the control unit 230 determines a communication carrier related to a base station (or a wireless access point), by interaction with the base station based on the determination result, and acquires the first authentication information related to the communication carrier from the authentication information storage unit 270. Also, the transmitted authentication request is the first authentication information stored in the authentication information storage unit 270, and includes the terminal identification information of the wireless communication device 200 and the base station identification information of the base station 115 connecting with the wireless communication device 200.

When the control server 300 receives the authentication request from the wireless communication device 200 (604), the transmission processing unit 390 transmits the authentication request to the authentication server 400 (605 and 606). That is, the authentication request is transmitted from the wireless communication device 200 to the authentication server 400.

Then, an authentication process is performed between the wireless communication device 200 and the authentication server 400. Then, the authentication process result is transmitted from the authentication server 400 to the wireless communication device 200 through the control server 300 and the base station 115 (609 to 614).

Also, the transmission processing unit 390 accesses the first communication carrier authentication server 113 through the first communication carrier control server 112 and a router (not illustrated) adjacent to the base station 115 connecting with the wireless communication device 200, using the second authentication information stored in the authentication information storage unit 370. Then, the transmission processing unit 390 transmits the authentication request to the first communication carrier authentication server 113 through the first communication carrier control server 113 (615 and 616). That is, the authentication request is transmitted from the wireless communication device 200 to the first communication carrier authentication server 113.

Then, an authentication process is performed between the control server 300 and the first communication carrier authentication server 113 (617 and 618). Then, the authentication process result is transmitted from the first communication carrier authentication server 113 to the control server 300 through the first communication carrier control server 112 (619 and 620). In this case, the control server 300 acquires the second authentication information for a network corresponding to the authentication request from the wireless communication device 200 (620). That is, the control server 300 acquires the second authentication information for the network corresponding to the authentication request by performing an authentication process with the first communication carrier authentication server 113 on behalf of the wireless communication device 200.

Then, the control unit 330 of the control server 300 transmits the information corresponding to the authentication request from the wireless communication device 200, to the wireless communication device 200 (621 and 622). In this transmission, the communication path between the wireless communication device 200 and the control server 300 is encrypted, and communication establishment information and the second authentication information (for example, USIM information) related to the first communication carrier 110 are included in the transmitted information.

Also, after this transmission, or in this transmission, information related to each base station adjacent to the base station 115 and information related to authentication information (third authentication information) used in the base station may be transmitted. That is, based on the second authentication information, the control unit 330 of the control server 300 transmits the third authentication information for connection with the neighboring base station located in the vicinity of the base station 115 connecting with the wireless communication device 200, thereby retaining the third authentication information. For example, the third authentication information may be retained in the memory 290 or the authentication information storage server 270. In this case, the control unit 230 of the wireless communication device 200 performs a connection process with the neighboring base station around the base station 115, based on a user's operation and a state change of the wireless communication device 200, using the retained third authentication information. Also, it is assumed that the state change of the wireless communication device 200 is the case in which the wireless communication device 200 exits from the cell 116 of the base station 115. For example, if a user's manual operation has been performed, and if the wireless communication device 200 exits from the cell of the base station 115 due to a user's movement, the third authentication information may be used to perform a connection process with the neighboring base station around the base station 115.

When receiving this information (622), the control unit 230 of the wireless communication device 200 performs communication establishment based on all of the received information (623).

In this manner, when the communication establishment is completed, the wireless communication device 200 may connect (general connection) with the public line network 101 through the base station 115 and the first communication carrier 110, the communication establishment information and the second authentication information related to the first communication carrier 110.

Also, FIG. 5 illustrates an example in which the authentication process between the wireless communication device 200 and the authentication server 400 is terminated, the authentication process result is transmitted (608 to 614), and the authentication process and so on in the first communication carrier authentication server 113 are performed (615 to 620). However, the authentication process and so on in the authentication server 400 (608 to 614) and the authentication process and so on in the first communication carrier authentication server 113 may be simultaneously performed. Also, the respective authentication processes may be performed out of sequence. Then, on the condition that the authentication has been performed through each authentication process, the control unit 330 of the control server 300 may transmit the information corresponding to the authentication request from the wireless communication device 200, to the wireless communication device 200 (621 and 622).

As described above, FIG. 5 has shown the example of the authentication process in the communication system 100. The following shows an example of an authentication process in an IP Multimedia Subsystem (IMS) network.

[Example of Authentication Process in IMS Network]

Figure 6:
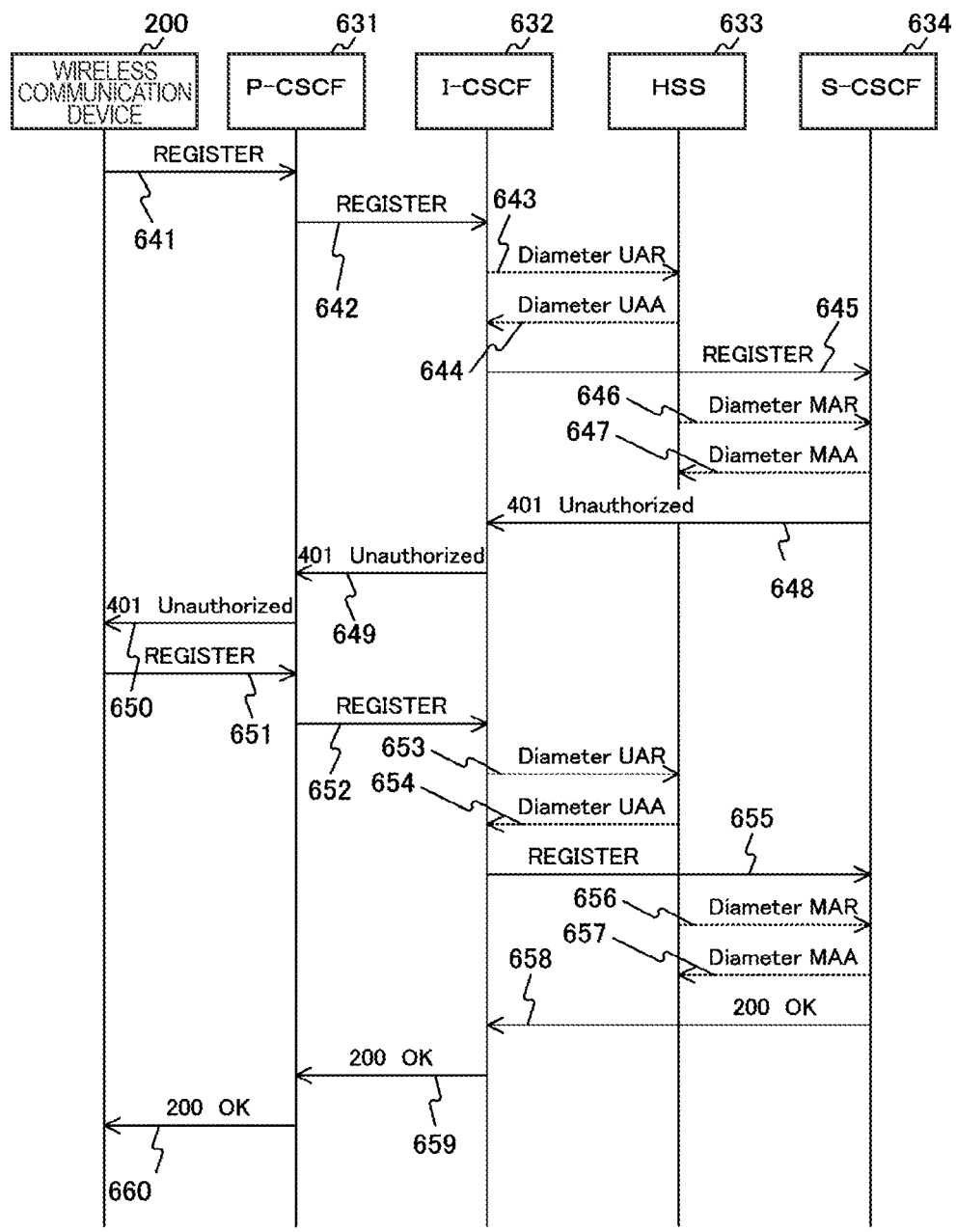
FIG. 6 is a sequence chart illustrating an example of an authentication process in an IMS network.

FIG. 6 is a sequence chart illustrating an example of an authentication process in an IMS network.

Herein, the functions of an IMS have been standardized by 3GPP. Also, the functions of a P-CSCF, an Interrogating-Call Session Control Function (I-CSCF), an S-CSCF, and an HSS have been defined by 3GPP.

Also, an example of a basic operation of an IMS will be described with reference to FIG. 6. Specifically, an example of an operation among a wireless communication device 200, a P-CSCF 631, an I-CSCF 632, an HSS 633, and an S-CSCF 634 will be described. In this case, the P-CSCF 631 functions as the control server 300 illustrated in FIG. 1 (FIG. 5), and the HSS 633 and the S-CSCF 634 function as the authentication server 400 illustrated in FIG. 1 (FIG. 5). Also, the communication between the P-CSCF 631 and the S-CSCF 634 is performed through the I-CSCF 632. Also, in FIG. 6, the illustration of the base station 115 illustrated in FIG. 1 (FIG. 5) is omitted.

For example, an authentication request (REGISTER) is transmitted from the wireless communication device 200 to the P-CSCF 631 (641). The authentication request is transmitted from the P-CSCF 631 to the S-CSCF 634 through the I-CSCF 632 (645). Also, the S-CSCF 634 performs an authentication process in conjunction with the HSS 633 (643, 644, 646 and 647), and generates a "challenge" message for the wireless communication device 200.

That is, a "User Authentication Request (UAR)" of a Diameter protocol is transmitted from the I-CSCF 632 to the HSS 633 (643). Also, a "User Authentication Answer (UAA)" of the Diameter protocol is transmitted from the HSS 633 to the I-CSCF 632 (644).

Also, a "Multimedia Auth Request (MAR)" of the Diameter protocol is transmitted from the HSS633 to the S-CSCF 634 (646). Also, a "Multimedia Auth Answer (MAA)" of the Diameter protocol is transmitted from the S-CSCF 634 to the HSS 633 (647).

When the wireless communication device 200 can return a normal response with respect to the generated messages (648 to 657), the authentication of the wireless communication device 200 is completed. In this case, an authentication completion notification is transmitted from the S-CSCF 634 to the wireless communication device 200 (658 to 660). For example, the authentication completion notification containing "200 OK" is transmitted (658 to 660).

[Example of Authentication Process in IMS Network]

Figure 7:
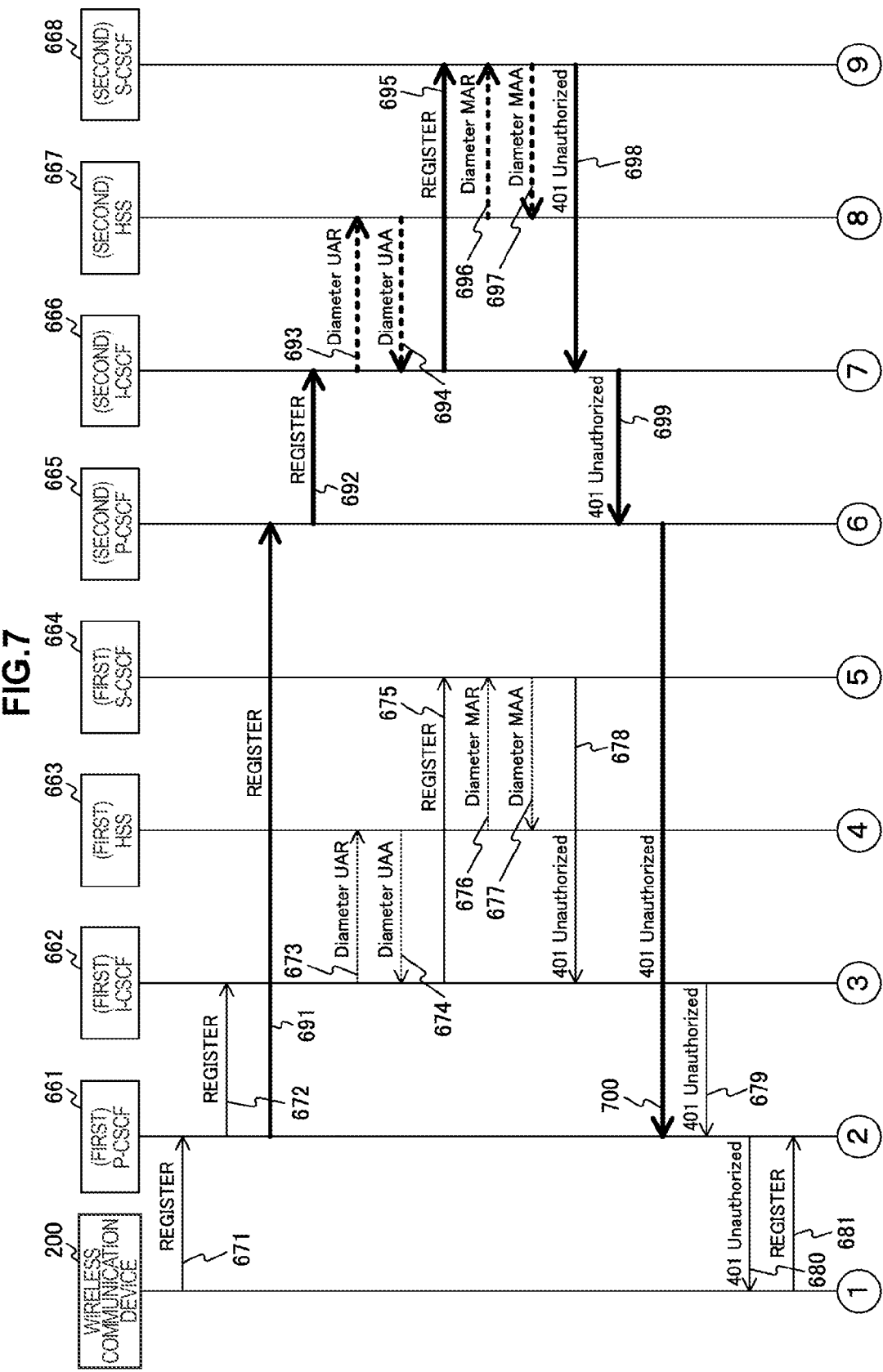
FIG. 7 is a sequence chart illustrating an example of an authentication process in a communication system 100 according to a first embodiment of the present technology.
Figure 8:
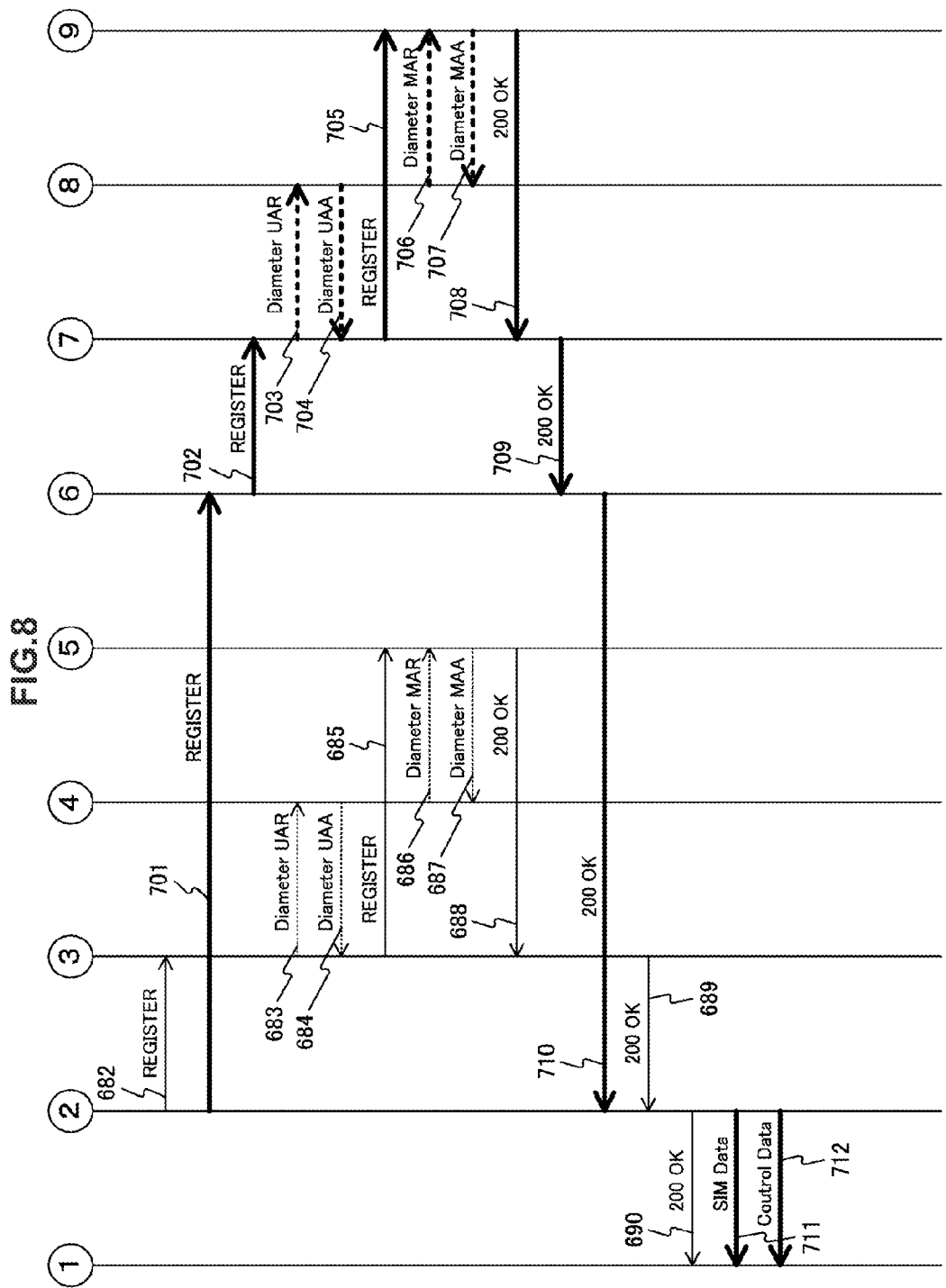
FIG. 8 is a sequence chart illustrating an example of an authentication process in a communication system 100 according to a first embodiment of the present technology.

FIGS. 7 and 8 are sequence charts illustrating an example of an authentication process in the communication system 100 according to the first embodiment of the present technology.

An example of an application of the present technology to an IMS will be described with reference to FIGS. 7 and 8. Specifically, an example of an operation among a wireless communication device 200, a P-CSCF 661, an I-CSCF 662, an HSS 663, an S-CSCF 664, a P-CSCF 665, an I-CSCF 666, an HSS 667, and an S-CSCF 668 will be described.

Herein, the (first) P-CSCF illustrated in FIG. 7 corresponds to the control server 300 illustrated in FIG. 1 (FIG. 5). That is, the (first) P-CSCF 661 corresponds to the P-CSCF 631 illustrated in FIG. 6, to which the function of transmitting the authentication request and the like are added.

Also, the (first) HSS 663 and the (first) S-CSCF 664 illustrated in FIG. 6 correspond to the authentication server 400 illustrated in FIG. 1 (FIG. 5). Also, the (second) P-CSCF 665 illustrated in FIG. 7 corresponds to the first communication carrier control server 112 illustrated in FIG. 1, and the (second) HSS 667 and the (second) S-CSCF 668 illustrated in FIG. 7 correspond to the first communication carrier authentication server 113 illustrated in FIG. 1 (FIG. 5). Moreover, in FIG. 6, the illustration of the base station 115 illustrated in FIG. 1 (FIG. 5) is omitted.

Also, a data flow corresponding to the example of the basic operation illustrated in FIG. 6 is indicated by thin lines (solid arrows or dotted arrows (for example, 671 and 672)), and a data flow newly added in FIGS. 7 and 8 is indicated by thick lines (solid arrows or dotted arrows (for example, 691 and 692)).

The wireless communication device 200 transmits an authentication request through the (first) P-CSCF 661 (671 and 672). Also, the (first) P-CSCF 661 transmits an authentication request for a second authentication process (691). A "challenge" message from the (first) S-CSCF 664 ("challenge" message for the wireless communication device 200) is transmitted to the wireless communication device 200 (678 to 680). Also, a "challenge" message from the (second) S-CSCF 668 ("challenge" message for the second authentication process) is transmitted to the (first) P-CSCF 661 (698 to 700).

Herein, a response to the "challenge" message from the (first) S-CSCF 664 is transmitted from the wireless communication device 200 (681 to 687). Also, a response to the "challenge" message for the second authentication process is transmitted from the (first) P-CSCF 661 (701 to 707).

When the wireless communication device 200 can transmit a normal response and the (first) P-CSCF 661 can transmit a normal response with respect to the generated messages (678 to 687 and 698 to 707), the authentication of the wireless communication device 200 is completed. In this case, an authentication completion notification is transmitted from the (second) S-CSCF 668 to the (first) P-CSCF 661 (708 to 710). Also, the authentication completion notification is transmitted from the (first) S-CSCF 664 to the wireless communication device 200 (688 to 690). For example, the authentication completion notification containing "200 OK" is transmitted (688 to 690 and 708 to 710).

Herein, a correspondence relation between each processing illustrated in FIG. 5 and each processing illustrated in FIGS. 7 and 8 will be described. Processing illustrated in FIG. 5 (601 to 604) corresponds to processing illustrated in FIG. 7 (671). Also, processing illustrated in FIG. 5 (605 and 606) corresponds to processing illustrated in FIG. 7 (672 and 675).

Also, processing illustrated in FIG. 5 (607 and 608) corresponds to processing illustrated in FIG. 7 (673 to 687). Moreover, processing illustrated in FIG. 5 (609 to 614) corresponds to processing illustrated in FIG. 8 (688 to 690).

Also, processing illustrated in FIG. 5 (615 and 616) corresponds to processing illustrated in FIGS. 7 and 8 (691, 692 and 695).

Also, processing illustrated in FIG. 5 (618 and 619) corresponds to processing illustrated in FIGS. 7 and 8 (693 to 707). Moreover, processing illustrated in FIG. 5 (619 and 620) corresponds to processing illustrated in FIG. 8 (708 to 710).

Also, processing illustrated in FIG. 5 (621 and 622) corresponds to processing illustrated in FIG. 8 (711 and 712).

[Example of Operation of Communication System] Next, the operation of the communication system 100 according to the first embodiment of the present disclosure will be described with reference to the drawings.

[Example of Operation of Wireless Terminal Device]

Figure 9:
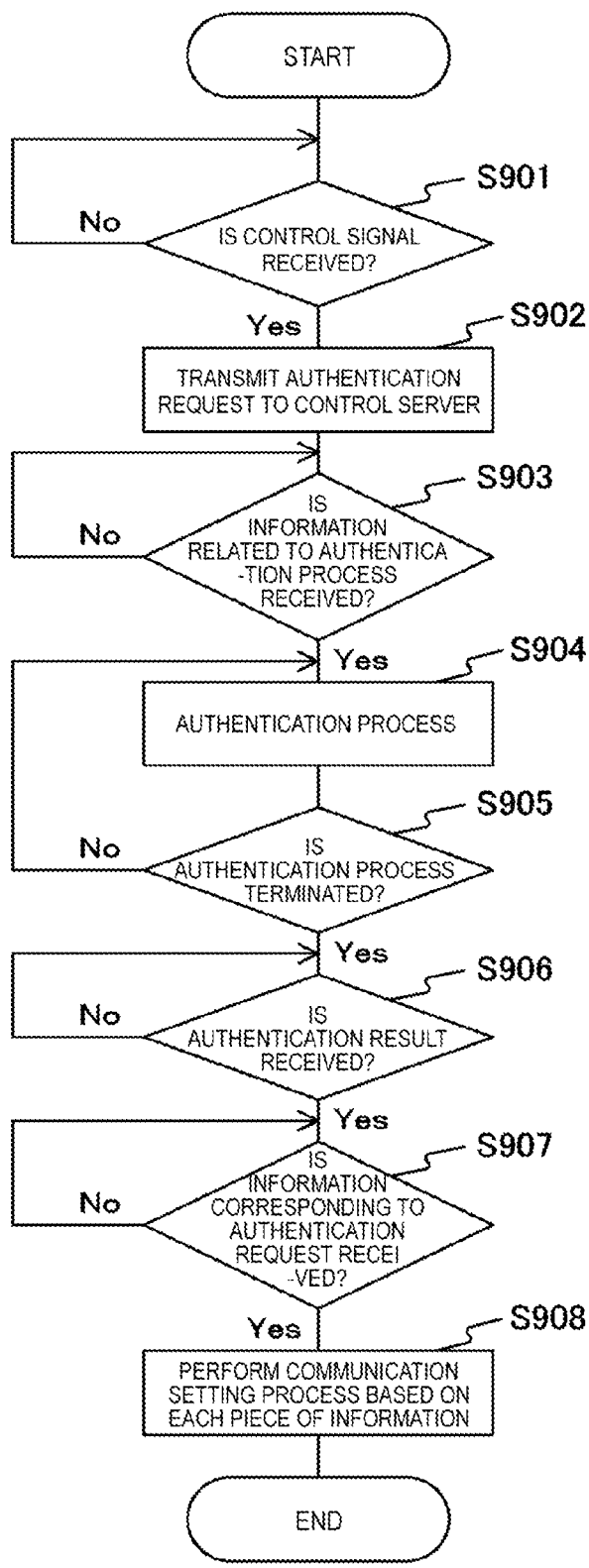
FIG. 9 is a flow chart illustrating an example of a processing procedure of an authentication information acquisition control process by a wireless communication device 200 according to a first embodiment of the present disclosure.

FIG. 9 is a flow chart illustrating an example of a processing procedure of an authentication information acquisition control process by the wireless communication device 200 according to the first embodiment of the present disclosure.

First, the control unit 230 determines whether a control signal from the base station 115 is received (step S901). When the control signal is not received, the control unit 230 continuously performs monitoring. On the other hand, when the control signal from the base station 115 is received (step S901), the control unit 230 transmits an authentication request to the control server 300 using first authentication information stored in the authentication information storage unit 270 (step S902). Also, step S902 is an example of a transmission procedure described in the claims.

Subsequently, the control unit 230 determines whether information related to the authentication process (first authentication process) performed by the authentication server 400 is received (step S903). When the information related to the first authentication process is not received, the control unit 230 continuously performs monitoring. On the other hand, when the information related to the first authentication process performed by the authentication server 400 is received (step S903), the control unit 230 performs the first authentication process with the authentication server 400 (step S904).

Subsequently, the control unit 230 determines whether the first authentication process performed with the authentication server 400 is terminated (step S905). When the first authentication process is not terminated, the control unit 230 returns to step S904. On the other hand, when the first authentication process is terminated (step S905), the control unit 230 determines whether the result of the first authentication process (authentication result) is received through the control server 300 (step S906). When the authentication result is not received, the control unit 230 continuously performs monitoring.

When the authentication result is received through the control server 300 (step S906), the control unit 230 determines whether each piece of information corresponding to the authentication request is received from the control server 300 (step S907). When each piece of information corresponding to the authentication request is not received (step S907), the control unit 230 continuously performs monitoring. On the other hand, when each piece of information corresponding to the authentication request is received from the control server 300 (step S907), the control unit 230 performs a communication setting process based on the received information (step S908). Also, step S908 is an example of a setting procedure described in the claims.

[Example of Operation of Control Server]

Figure 10:
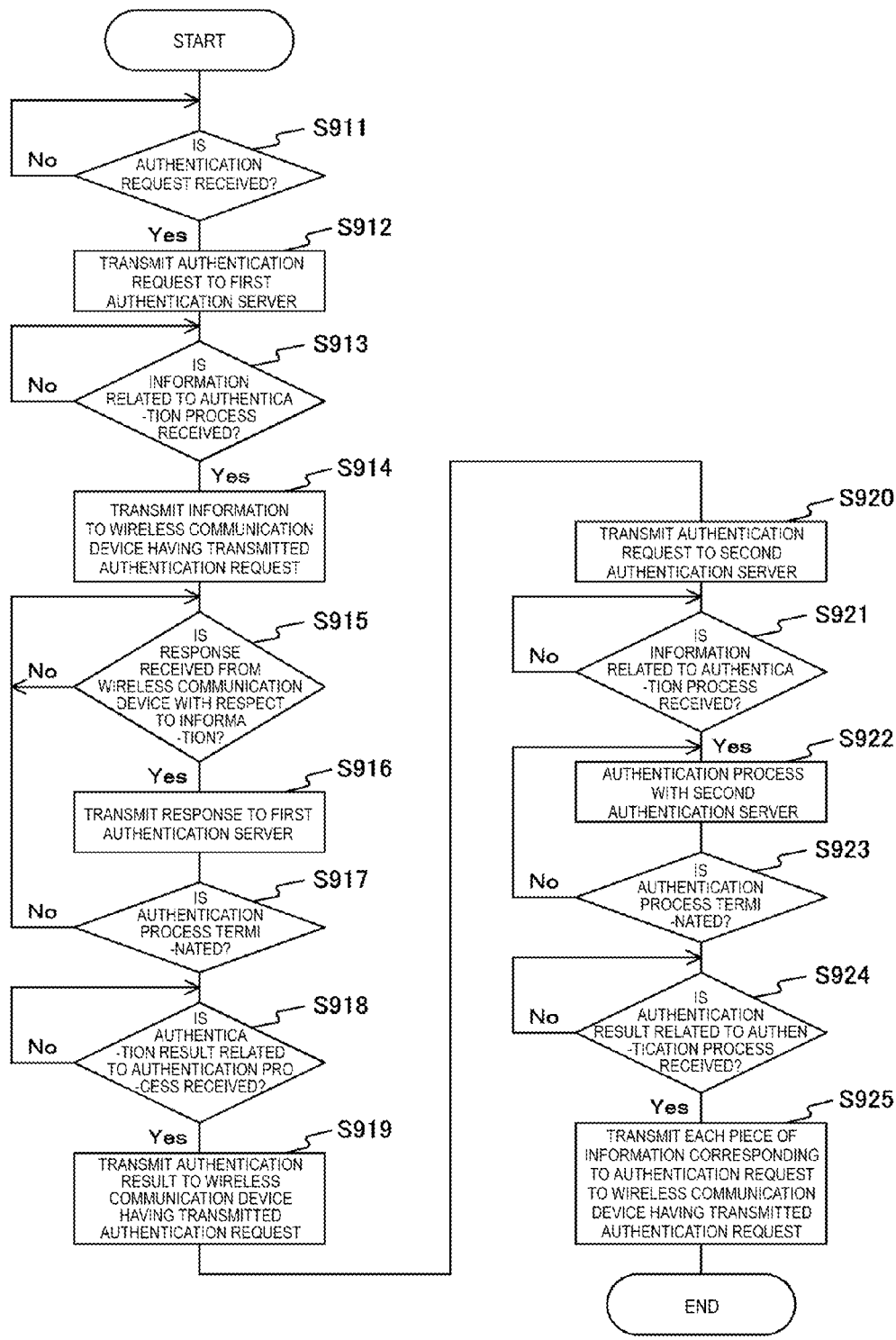
FIG. 10 is a flow chart illustrating an example of a processing procedure of an authentication information transmission control process by a control server 300 according to a first embodiment of the present disclosure.

FIG. 10 is a flow chart illustrating an example of a processing procedure of an authentication information transmission control process by the control server 300 according to the first embodiment of the present disclosure. FIG. 10 illustrates an example of a second authentication process of transmitting an authentication request to a second authentication server (first communication carrier authentication server 113) after the first authentication process by the first authentication server (authentication server 400) is terminated.

First, the control unit 330 determines whether an authentication request from the wireless communication device is received (step S911). When the authentication request is not received, the control unit 330 continuously performs monitoring. On the other hand, when the authentication request from the wireless communication device is received (step S911), the transmission processing unit 390 transmits the authentication request to the first authentication server (authentication server 400) (step S912). That is, the authentication request from the wireless communication device 200 is transmitted to the authentication server 400.

Subsequently, the control unit 330 determines whether the information related to the authentication process (first authentication process) by the authentication server 400 is received (step S913). When the information related to the first authentication process is not received, the control unit 330 continuously performs monitoring. On the other hand, when the information related to the first authentication process is received (step S913), the control unit 330 transmits the information to the wireless communication device having transmitted the authentication request (step S914).

Subsequently, the control unit 330 determines whether a response to the information is received from the wireless communication device (step S915). When the response is not received, the control unit 330 continuously performs monitoring. On the other hand, when the response is received (step S915), the control unit 330 transmits the response to the first authentication server (authentication server 400) (step S916).

Subsequently, the control unit 330 determines whether the first authentication process is terminated (step S917). When the first authentication process is not terminated, the control unit 330 returns to step S915. On the other hand, when the first authentication process is terminated (step S917), the control unit 330 determines whether the result of the first authentication process (authentication result) is received (step S918).

When the authentication result is not received, the control unit 330 continuously performs monitoring. On the other hand, when the authentication result is received (step S918), the control unit 330 transmits the authentication result to the wireless communication device having transmitted the authentication request (step S919).

Subsequently, the transmission processing unit 390 transmits the authentication request to the second authentication server (first communication carrier authentication server 113) (step S920). That is, the authentication request from the wireless communication device 200 is transmitted to the first communication carrier authentication server 113.

Subsequently, the control unit 330 determines whether information related to an authentication process (second authentication process) by the first communication carrier authentication server 113 is received (step S921). When the information related to the second authentication process is not received, the control unit 330 continuously performs monitoring. On the other hand, when the information related to the second authentication process is received (step S921), the control unit 330 performs the second authentication process with the first communication carrier authentication server 113 (step S922).

Subsequently, the control unit 330 determines whether the second authentication process is terminated (step S923). When the second authentication process is not terminated, the control unit 330 returns to step S922. On the other hand, when the second authentication process is terminated (step S923), the control unit 330 determines whether the result of the second authentication process (authentication result) is received (step S924). When the authentication result is not received, the control unit 330 continuously performs monitoring.

When the authentication result is received (step S924), the control unit 330 transmits each piece of information corresponding to the authentication request to the wireless communication device having transmitted the authentication request (step S925).

[Example of Operation of Authentication Server]

Figure 11:
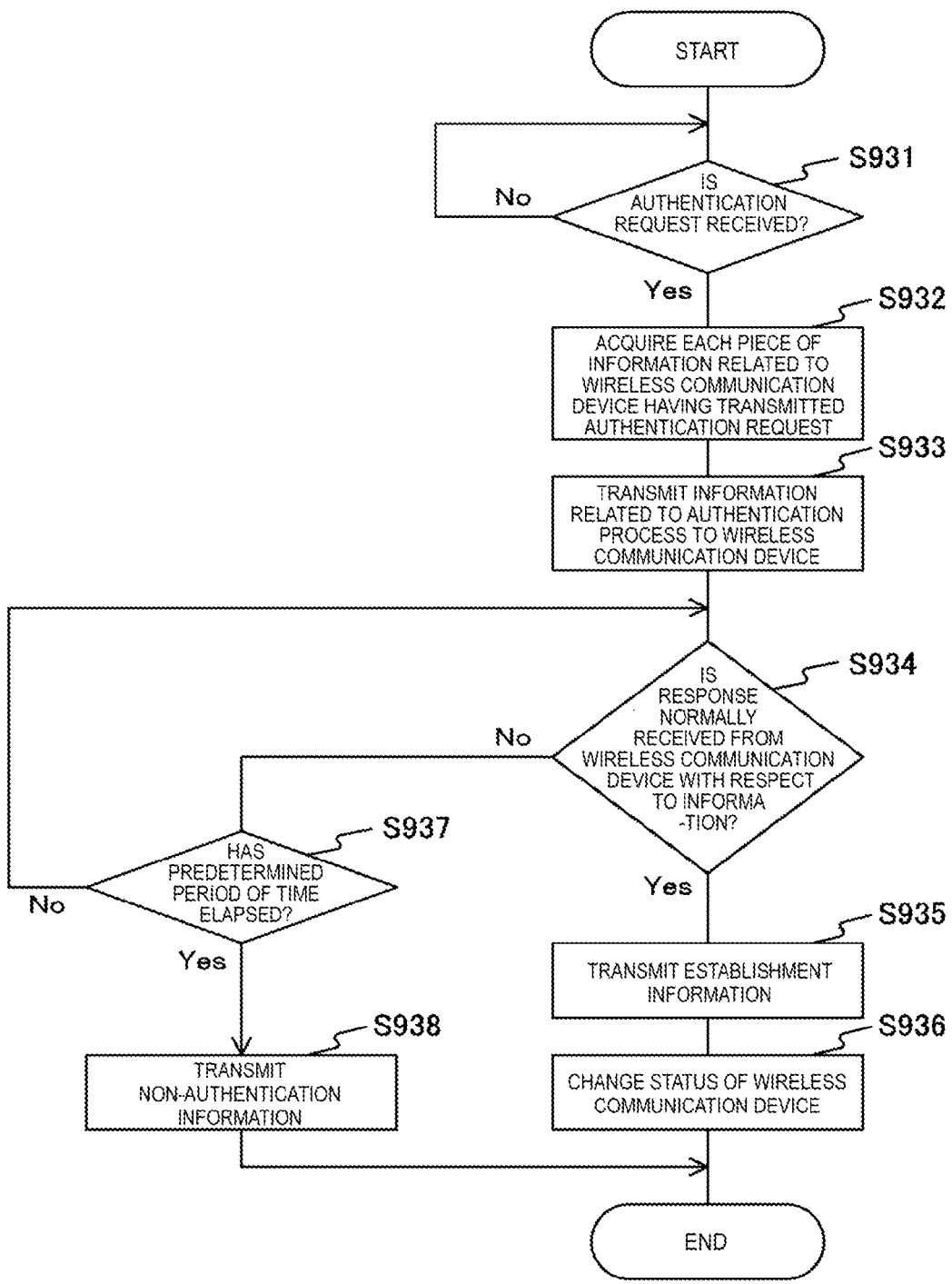
FIG. 11 is a flow chart illustrating an example of a processing procedure of an authentication information transmission control process by a control server 400 according to a first embodiment of the present disclosure.

FIG. 11 is a flow chart illustrating an example of a processing procedure of an authentication information transmission control process by the authentication server 400 according to the first embodiment of the present disclosure.

First, the control unit 430 determines whether an authentication request from the wireless communication device is received through the control server 300 (step S931). When the authentication request is not received, the control unit 430 continuously performs monitoring. On the other hand, when the authentication request from the wireless communication device is received through the control server 300 (step S931), the control unit 430 acquires each piece of information related to the wireless communication device having transmitted the authentication request (step S932). For example, terminal information stored in the terminal information storage unit 450 and user information stored in the user information storage unit 480 are acquired.

Subsequently, the control unit 430 transmits the information related to the authentication process (first authentication process) to the wireless communication device having transmitted the authentication request through the control server 300 (step S933).

Subsequently, the control unit 430 determines whether a response to the information is received from the wireless communication device (step S934). When the response is not received, the control unit 430 continuously performs monitoring. On the other hand, when the response is received (step S934), the control unit 430 transmits establishment information (for example, information related to each base station located in the vicinity of the base station) to the control server 300 and includes it in the result of the first authentication process (authentication result). Subsequently, the control unit 430 changes the contents stored in the terminal information storage unit 450 (step S936). That is, the status of the wireless communication device having transmitted the authentication request is changed.

Also, when the response to the information related to the first authentication process is not received from the control server 300 (step S934), the control units 430 determine whether a predetermined period of time has elapsed (step S937). When the predetermined period of time has not elapsed, the control unit 430 returns to step S934. On the other hand, when the predetermined period of time has elapsed (step S937), the control unit 430 transmits information indicating non-authentication through the control server 300 to the wireless communication device having transmitted the authentication request (step S938).

[Example of Display of Network Detection Result Notification Screen]

Figure 12:
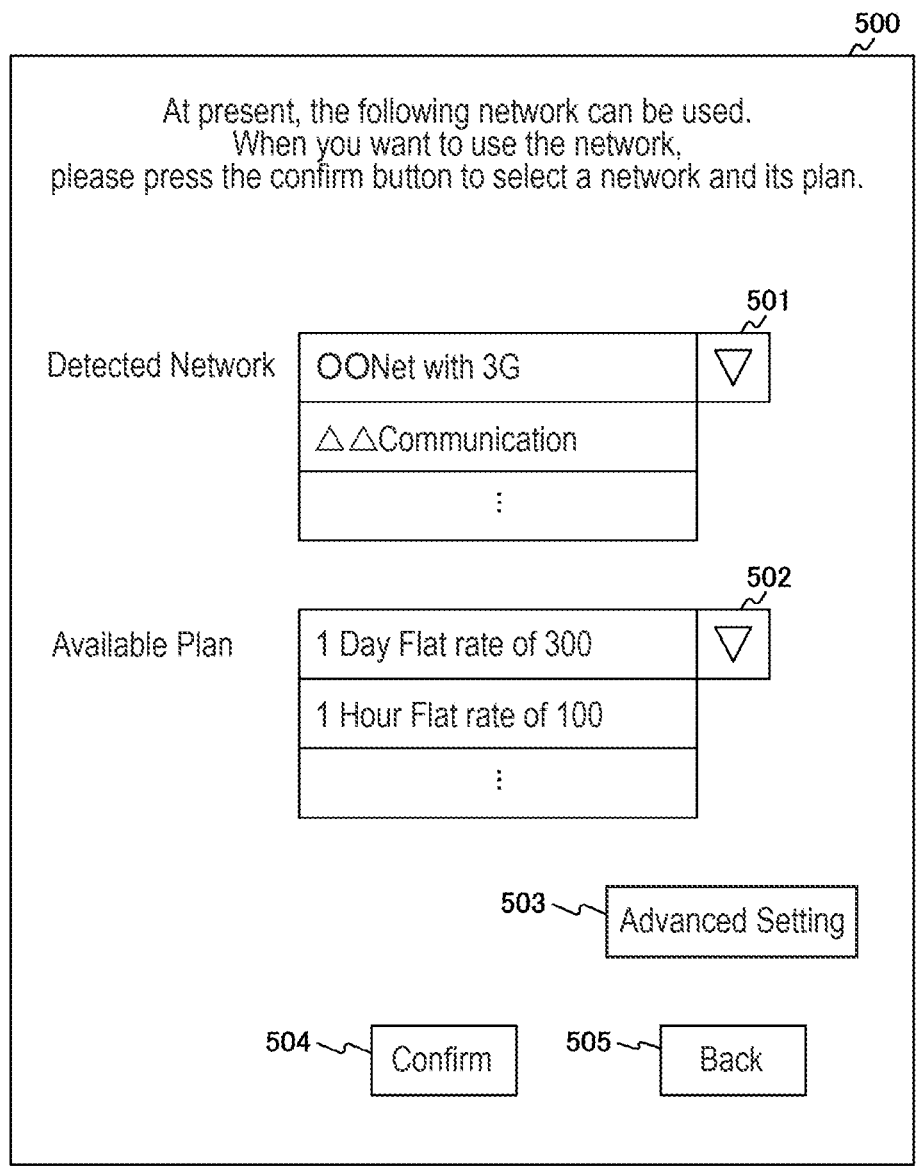
FIG. 12 is a view illustrating an example of a display screen displayed on a display unit 250 of a wireless communication device 200 according to a first embodiment of the present technology.

The example in which, when the control signal from the base station is received, the wireless communication device 200 automatically performs the authentication request for the communication carrier operating the base station has been described above. However, when the control signal from the base station is received, the user is notified of the reception, and the user is allowed to confirm whether to perform the authentication request for the communication carrier operating the base station. Then, the authentication request may be performed. FIG. 12 illustrates an example of the notification.

FIG. 12 is a view illustrating an example of a display screen displayed on the display unit 250 of the wireless communication device 200 according to the first embodiment of the present technology. A network detection result notification screen 500 illustrated in FIG. 12 is a display screen that notifies the user that the control signal from the base station is detected.

The network detection result notification screen 500 includes a detected network display area 501, an available plan display area 502, an advanced setting button 503, a confirm button 504, and a back button 505.

The detected network display area 501 is an area that displays information related to the detected base station (network information) when the control signal from the base station is detected.

The available plan display area 502 is an area that displays an available plan when using a network whose network information is displayed on the detected network display area 501.

Also, when there are a plurality of items to be displayed in the detected network display area 501 or the available plan display area 502, a list of the plurality of items may be displayed. For example, the list of the plurality of items may be displayed by pressing a pull-down button (∇) in each display area. When the plurality of items are displayed, the user is allowed to perform a selection operation to select a desired item.

The advanced setting button 503 is a button that is pressed when displaying an advanced setting screen. The advanced setting screen is a display screen on which further detailed contents are set by the user's operation.

The confirm button 504 is a button that is pressed when confirming the operation contents after the above-described operations (input operation and selection operation).

The back button 505 is a button that is pressed, for example, when returning to the display screen displayed immediately before the current display screen.

[Example of Operation of Wireless Communication Device]

Figure 13:
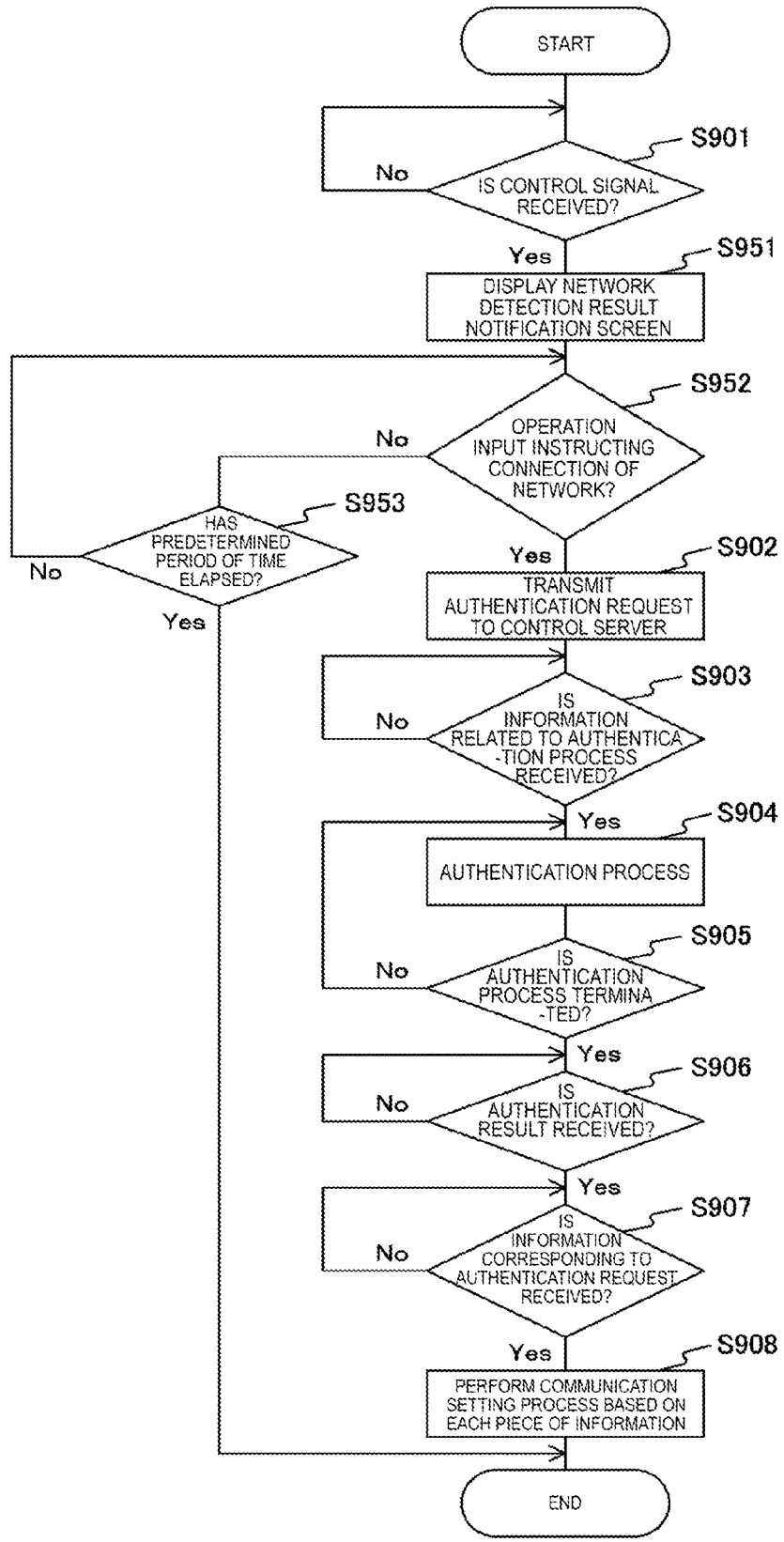
FIG. 13 is a flow chart illustrating an example of a processing procedure of an authentication information acquisition control process by a wireless communication device 200 according to a first embodiment of the present disclosure.

FIG. 13 is a flow chart illustrating an example of a processing procedure of an authentication information acquisition control process by the wireless communication device 200 according to the first embodiment of the present disclosure. This example shows an example in which, when the control signal from the base station is received, an authentication request for the communication carrier operating the base station is performed based on the user's operation. Also, since the processing procedure is a modified example of FIG. 9, the same reference numerals are assigned to the same parts as those of FIG. 9, and descriptions thereof will be omitted.

When the control signal from the base station is received (step S901), the control unit 230 displays the display screen (for example, a network detection result notification screen 500) on the display unit 250 so as to notify the user of the reception (step S951).

Subsequently, it is determined whether an operation input of instructing a connection to the network whose network information is displayed on the display screen (for example, operation of pressing the confirm button 504) is performed (step S952). When the operation input of instructing the connection to the network is performed (step S952), the control unit 230 transmits an authentication request to the control server 300 so as to connect to the network (step S902). On the other hand, when the operation input of instructing the connection to the network is not performed (for example, when the back button 505 is pressed) (step S952), it is determined whether a predetermined period of time has elapsed (step S953). When the predetermined period of time has not elapsed (step S953), the process returns to step S952. On the other hand, when the predetermined period of time has elapsed (step S953), the operation of the authentication information acquisition control process is terminated.

Therefore, when the control signal from the base station is received and it is confirmed that there is a communicable wireless communication network, the wireless communication device 200 displays the network detection result notification screen 500. On the network detection result notification screen 500, the user may confirm whether to use the displayed network. Also, on the network detection result notification screen 500, the user may perform a variety of settings with respect to a wireless communication network available at a place where the wireless communication device 200 is located, and a charging method when the network is used.

<2. Modified Example>

With regard to the first embodiment of the present technology, an example in which the authentication request for the communication carrier operating the base station is performed when the control signal from the base station is received has been described. However, only when the condition of the communication carrier performing the authentication request is set in advance and the corresponding communication carrier is detected, may the setting of the authentication information (second authentication information) be performed automatically. Therefore, this modified example shows an example in which the condition of the communication carrier performing the authentication request is set in advance.

[Example of Display of condition Setting Screen]

Figure 14:
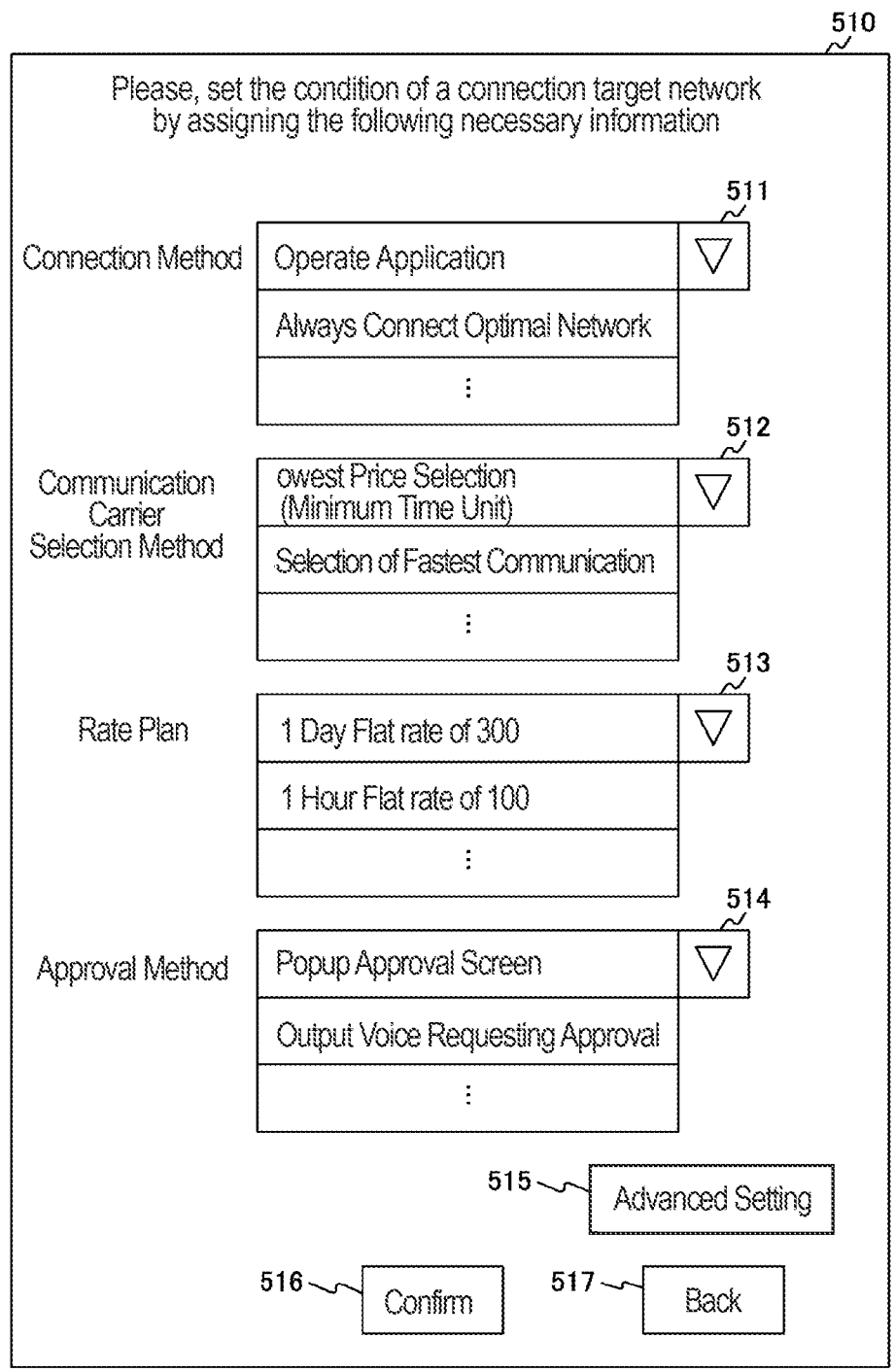
FIG. 14 is a view illustrating an example of a display screen displayed on a display unit 250 of a wireless communication device 200 according to a modified example of a first embodiment of the present technology.

FIG. 14 is a view illustrating an example of a display screen displayed on the display unit 250 of the wireless communication device 200 according to a modified example of the first embodiment of the present technology. A condition setting screen 510 illustrated in FIG. 14 is a display screen that allows the user to set the condition of a desired network among networks (communication carriers) detected by the wireless communication device 200.

The condition setting screen 510 includes a connection method display area 511, a communication carrier selection method display area 512, a rate plan display area 513, an approval method display area 514, an advanced setting button 515, a confirm button 516, and a back button 517.

The connection method display area 511 is an area that displays a list of connection methods for connecting to the network related to the detected base station when the control signal from the base station is detected. As the connection methods, for example, the user may set a timing of connecting to the network. For example, the user may select and set the connection methods, such as a method of always connecting to the network when the network exists, or a method of connecting to the network according to whether an application using the network is used. As the method of connecting to the network according to whether the application is used, for example, a method for performing a connection process when the activation of the application using the network is detected and stopping the connection at the moment the non-use of the application is detected may be considered.

The communication carrier selection method display area 512 is an area that displays a list of selection methods for selecting a desired network (communication carrier) among networks related to the detected base station when the control signal from the base station is detected. For example, when there are a plurality of connectable networks (communication carriers), the method of selecting the communication carriers may be set.

The rate plan display area 513 is an area that displays a list of rate plans provided by the communication carrier selected on the communication carrier selection method display area 512.

The approval method display area 514 is an area on which, when the networks corresponding to the above-described respective items are detected, the user is notified of the detection, and a list of approval methods is displayed when an approval of the start of the communication using the network is requested. For example, a connection approval method on the condition that an approval operation is performed by the user, or an automatic connection approval method without the user's approval operation is assumed. Also, an example of an approval screen for the user's approval operation is illustrated in FIG. 1.

Also, in the communication carrier selection method display area 512, the rate plan display area 513, and the approval method display area 514, the connection method display area 511 may display a list of a plurality of items when the pull-down button (∇) of each display area is pressed. In this way, an item desired by the user may be selected among the plurality of listed items by the user's selection operation.

The advanced setting button 515 is a button that is pressed when displaying the advanced setting screen. The advanced setting screen is a display screen on which further detailed contents are set by the user's operation.

The confirm button 516 is a button that is pressed when confirming the contents of the operations after the above-described operations (input operation and selection operation). When the confirm button 516 is pressed, the contents set by the above-described respective operations (input operation and selection operation) are stored in the memory 290 of the wireless communication device 200.

The back button 517 is a button that is pressed, for example, when returning to the display screen displayed immediately before the current display screen.

[Example of Display of Approval Screen]

Figure 15:
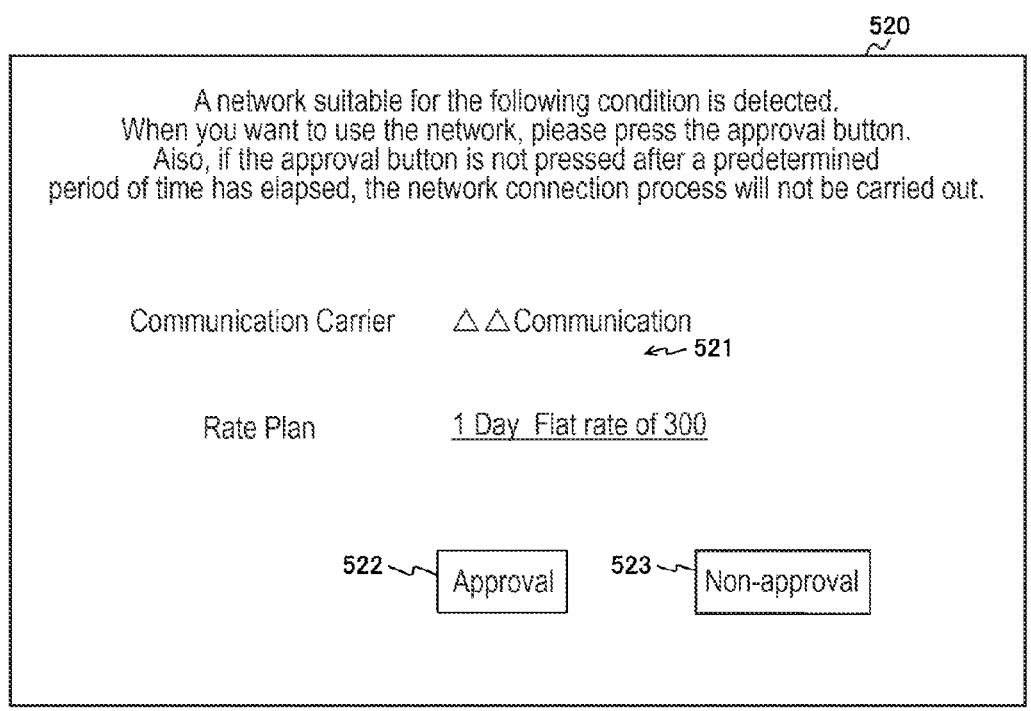
FIG. 15 is a view illustrating an example of a display screen displayed on a display unit 250 of a wireless communication device 200 according to a modified example of a first embodiment of the present technology.

FIG. 15 is a view illustrating an example of a display screen displayed on the display unit 250 of the wireless communication device 200 according to the modified example of the first embodiment of the present technology. The approval screen 520 illustrated in FIG. 15 is a display screen that notifies of the detection of the network when the network satisfying the respective conditions set on the condition setting screen 510 is detected, and obtains the user's approval.

The approval screen 520 includes a network information display area 521, an approval button 522, and a non-approval button 523.

The network information display area 521 is an area that displays information related to the network (network information) when the network satisfying the respective conditions set on the condition setting screen 510 is detected.

The approval button 522 is a button that is pressed when the connection of the network displayed on the network information display area 521 is approved. When the approval button 522 is pressed, the connection process displayed on the network information display area 521 is started.

The non-approval button 523 is a button that is pressed when the connection of the network displayed on the network information display area 521 is not approved. When the non-approval button 523 is pressed, the process of connecting to the network displayed on the network information display area 521 is not performed, and other display screen is displayed on the display unit 250.

[Example of Operation of Wireless Communication Device]

FIG. 16 is a flow chart illustrating an example of a processing procedure of an authentication information acquisition control process by the wireless communication device 200 according to the first embodiment of the present disclosure. In this example, an authentication request for a network desired by a user among the networks (communication carriers) detected by the wireless communication device 200 is automatically performed. Also, since the processing procedure is a modified example of FIG. 9, the same reference numerals are assigned to the same parts as those of FIG. 9, and descriptions thereof will be omitted.

When the control signal from the base station is received (step S901), the control unit 230 compares the network related to the detected base station with the setting contents stored in the memory 290 (step S961). When the detected network is suitable for the setting contents stored in the memory 290 (step S962), the control unit 230 determines whether the approval by the user is necessary, based on the setting contents stored in the memory 290 (step S963).

When the approval by the user is necessary (step S963), the control unit 230 displays the approval screen to request the user's approval (for example, the approval screen 520 illustrated in FIG. 15) on the display unit 250 (step S964).

Subsequently, it is determined whether the approval operation on the approval screen (for example, the operation of pressing the approval button 522) is performed (step S965). When the approval operation is performed, the process returns to step S902. On the other hand, when the approval operation is not performed on the approval screen (step S965), it is determined whether a predetermined period of time has elapsed after displaying the approval screen (step S966). When the predetermined period of time has not elapsed after displaying the approval screen (step S966), the process returns to step S965. On the other hand, when the predetermined period of time has not elapsed after displaying the approval screen (step S966), the operation of the authentication process acquisition control process is terminated.

Also, when the approval by the user is not necessary (step S963), the process proceeds to step S902.

Herein, the case in which a portable phone as an example of the wireless communication device is switched to a wireless communication system different from an existing network is assumed. In this case, for example, when a method of switching to the same USIM information (same number: number portability) is used, it takes time to update a database of a plurality of communication carriers. Also, in this case, when a phone call is made from the outside of the network, it is assumed that it is difficult to perform control to detect which communication carrier the portable phone is in. Also, a method in which a single operator server acts for the entire system switching by taking the form of the MVNO (so-called virtual communication carrier) is also assumed. However, in this case, the following assumptions (1) to (3) are made.

(1) The number of users is fixed for a precontract.

(2) It becomes burdensome for the single operator server to perform the entire authentication process.

(3) When a service provided by each carrier is changed, the MVNO needs to cope with the change.

Also, when the portable phone rewrites the USIM information, it is assumed to download and rewrite the USIM information over the wireless communication network. In this case, when a wireless communication line is unstable, it is assumed that the portable device has deviated from the range of the existing communication system, without succeeding in download. In this case, it is preferable that there be an authentication information in order to temporarily use the communication system that may be used at that position. Also, even when the USIM information is rewritten, it is assumed that it is difficult to perform call processing from an external network.

Also, merely downloading the USIM information of the wireless communication system used may make it difficult to find out whether different wireless communication systems are available around the portable phone. Therefore, for example, when a moving speed of the portable phone is high, it is assumed that a handover to a different wireless communication system is difficult.

Also, it is important to prevent the degradation of security by mounting common key information, which is used within a core network of the communication carrier, on rewritable USIM information.

Therefore, in the embodiment of the present technology, the wireless communication device 200 performs the first authentication process, and the control server 300 performs the second authentication process instead of the wireless communication device 200. Therefore, the authentication information for the communication carrier (second authentication information (for example, USIM information)) may be automatically rewritten. Also, the authentication process may be performed while common key information used by the respective communication carriers is not mounted on the rewritable USIM information.

Also, in the embodiment of the present technology, information related to a base station of a different communication carrier around the position where the wireless communication device 200 is located may be provided to the wireless communication device 200. Therefore, it may be determined whether a different wireless communication system is available around the portable phone. As described above, according to the embodiment of the present technology, the communication may be realized by selecting the optimal communication line using the wireless communication system capable of using a plurality of communication carriers. The right for connection to the network may be easily used.

Also, in the embodiment of the present technology, as the connection right for connection to a predetermined network, the connection right based on the USIM information has been described as an example. However, the embodiment of the present technology may also be applied to other connection right for connection to a predetermined network, based on other information (for example, a Machine Communication Identity Module (MCIM)).

Also, in the embodiment of the present technology, the information processing devices configured as a unit (control servers and authentication servers, such as the control server 300 and the authentication server 400, and so on) have been described as an example. However, the embodiment of the present technology may also be applied to the information processing system in which the respective units included in these information processing devices are configured by a plurality of devices. Also, the embodiment of the present technology may be applied to other portable wireless terminal devices (for example, a dedicated data communication terminal device) or a fixed wireless terminal device (for example, a wireless terminal device for data collection of a vending machine).

Also, the above-described embodiments are intended only to show examples realizing the present technology, and matters according to the embodiments and specific inventive matters within the scope of claims have a correspondence relation. Likewise, specific inventive matters within the scope of claims, and matters according to the embodiments of the present technology, to which the same names as the specific inventive matters are assigned, have a correspondence relation. However, the present technology is not limited to the embodiments, and the embodiments may also be modified in various forms without departing from the scope and spirit of the present technology.

Also, the processing procedures described in the above-mentioned embodiments may be methods including a series of these steps, and may also include a program for executing a series of these steps on a computer or a recording medium storing the program. As the recording medium, for example, a Compact Disc (CD), Minidisc (MD), a Digital Versatile Disc (DVD), a memory card, a Blu-ray Disc (trademark), or the like may be used.

Additionally, the present technology may also be configured as below.

(1)

A wireless communication device including:

a transmission control unit configured to transmit an establishment request for establishment of connection right for wireless connection with a predetermined network to an information processing device performing a control for establishment of the connection right through a wireless line; and a control unit configured to perform a control for the establishment of the connection right, based on establishment information transmitted from the information processing unit, on the condition that the establishment request has been authenticated by a first authentication device performing a first authentication process related to the wireless communication device and the establishment request has been authenticated by a second authentication device performing a second authentication process related to the establishment of the connection right.

(2)

The wireless communication device according to (1), further including:

an authentication information storage unit configured to store first authentication information used when the first authentication process is performed, wherein the control unit uses the first authentication information to perform the first authentication process with the first authentication device.

(3)

The wireless communication device according to (2), wherein the first authentication information is common authentication information that is stored and used in a plurality of wireless communication devices including the wireless communication device and other wireless communication devices, and wherein the information processing device retains group information on a group including the plurality of wireless communication devices, and transmits the establishment request to the first authentication device when receiving the establishment request from the wireless communication device included in the group.

(4)

The wireless communication device according to any one of (1) to (3), wherein the information processing device transmits the establishment request to the first authentication device and also transmits the establishment request to the second authentication device when receiving the establishment request, and performs control for the establishment of the connection right for the wireless communication device on the condition that the establishment request has been authenticated by the first authentication process performed between the first authentication device and the wireless communication device, and the establishment request has been authenticated by the second authentication process performed between the second authentication device and the information processing device.

(5)

The wireless communication device according to any one of (1) to (3), wherein the connection right is right to connect with the network by connecting with a base station related to the network based on second authentication information, and wherein the information processing device establishes the connection right for the wireless communication device by retaining the second authentication information in the wireless communication device, on the condition that the establishment request has been authenticated by the first authentication device and the establishment request has been authenticated by the second authentication device.

(6)

The wireless communication device according to (5), wherein the information processing device transmits third authentication information for connection with a neighboring base station located in the vicinity of the base station connected to the wireless communication device based on the second authentication information, to retain the third authentication information, and wherein the control unit performs a connection process with the neighboring base station using the third authentication information, based on a user's operation or a state change of the wireless communication device.

(7)
The wireless communication device according to any one of (1) to (6),
wherein the information processing device stores second authentication information used to perform the second authentication process, and
wherein the information processing device uses the second authentication information to perform the second authentication process with the second authentication device.

(8)
The wireless communication device according to any one of (1) to (7),
wherein the first authentication device performs the first authentication process with the wireless communication device, and
wherein the second authentication device performs the second authentication process with the information processing device.

(9)
An information processing device including:
a transmission processing unit configured to transmit, when receiving an establishment request for establishment of connection right for wireless connection with a predetermined network from a wireless communication device, the establishment request to a first authentication device performing a first authentication process related to the wireless communication device and the establishment request to a second authentication device performing a second authentication process related to the wireless communication device; and
a control unit configured to perform a control for the establishment of the connection right for the wireless communication device, on the condition that the establishment request has been authenticated by the first authentication process performed between the first authentication device and the wireless communication device and the establishment request has been authenticated by the second authentication process performed between the second authentication device and the information processing device.

(10)
A communication system including:
a wireless communication device including a control unit configured to transmit an establishment request for establishment of connection right for wireless connection with a predetermined network, to an information processing device performing a control for establishment of the connection right through a wireless line, and establish the connection right based on establishment information from the information processing device; and
an information processing device including a control unit configured to perform a control for the establishment of the connection right for the wireless communication device, when receiving the establishment request from the wireless communication device, on the condition that the establishment request has been authenticated by a first authentication device performing a first authentication process related to the wireless communication device and the establishment request has been authenticated by a second authentication device performing a second authentication process related to the establishment of the connection right.

(11)
A method for controlling a wireless communication device, including:
transmitting an establishment request for establishment of connection right for wireless connection with a predetermined network, to an information processing device performing a control for establishment of the connection right through a wireless line; and
establishing the connection right based on establishment information transmitted from the information processing unit, on the condition that the establishment request has been authenticated by a first authentication device performing a first authentication process related to the wireless communication device and the establishment request has been authenticated by a second authentication device performing a second authentication process related to the establishment of the connection right.

The present disclosure contains subject matter related to that disclosed in Japanese Priority Patent Application JP 2011-117581 filed in the Japan Patent Office on May 26, 2011, the entire content of which is hereby incorporated by reference.

What is claimed is:

1. A wireless communication device comprising:
a transmission control unit configured to transmit an establishment request for establishment of connection right for wireless connection with a predetermined network to an information processing device performing a control for establishment of the connection right through a wireless line; and
a control unit configured to perform a control for the establishment of the connection right, based on establishment information transmitted from the information processing device, on the condition that the establishment request has been authenticated by a first authentication device performing a first authentication process related to the wireless communication device and the establishment request has been authenticated by a second authentication device performing a second authentication process related to the establishment of the connection right;
wherein the connection right is a right to connect with the network by connecting with a base station related to the predetermined network based on second authentication information,
wherein the information processing device establishes the connection right for the wireless communication device by retaining the second authentication information in the wireless communication device, on a condition that the establishment request has been authenticated by the first authentication device and the establishment request has been authenticated by the second authentication device,
wherein the information processing device transmits third authentication information for connection with a neighboring base station located in a vicinity of the base station connected to the wireless communication device based on the second authentication information, to retain the third authentication information, and
wherein the control unit performs a connection process with the neighboring base station using the third authentication information, based on a user's operation or a state change of the wireless communication device.

2. The wireless communication device according to claim 1, further comprising:
an authentication information storage unit configured to store first authentication information used when the first authentication process is performed,
wherein the control unit uses the first authentication information to perform the first authentication process with the first authentication device.

3. The wireless communication device according to claim 2, wherein the first authentication information is common authentication information that is stored and used in a plurality of wireless communication devices including the wireless communication device and other wireless communication devices, and wherein the information processing device retains group information on a group including the plurality of wireless communication devices, and transmits the establishment request to the first authentication device when receiving the establishment request from the wireless communication device included in the group.

4. The wireless communication device according to claim 1, wherein the information processing device transmits the establishment request to the first authentication device and also transmits the establishment request to the second authentication device when receiving the establishment request, and performs control for the establishment of the connection right for the wireless communication device on a condition that the establishment request has been authenticated by the first authentication process performed between the first authentication device and the wireless communication device and that the establishment request has been authenticated by the second authentication process performed between the second authentication device and the information processing device.

5. The wireless communication device according to claim 1, wherein the information processing device stores second authentication information used to perform the second authentication process, and wherein the information processing device uses the second authentication information to perform the second authentication process with the second authentication device.

6. The wireless communication device according to claim 1, wherein the first authentication device performs the first authentication process with the wireless communication device, and wherein the second authentication device performs the second authentication process with the information processing device.

* * * * *